United States Patent
Pflueger et al.

(10) Patent No.: US 10,302,190 B2
(45) Date of Patent: May 28, 2019

(54) METHOD FOR EVALUATING THE SHIFTING BEHAVIOR OF A MOTOR VEHICLE TRANSMISSION

(71) Applicant: AVL LIST GMBH, Graz (AT)

(72) Inventors: Falko Pflueger, Stattegg-Hohenberg (AT); Patrick Schatz, Prebl (AT); Martin Wohlfahrt, Graz (AT); Erik Bogner, Graz (AT); Thomas Frank Mueller-Werth, Graz (AT)

(73) Assignee: AVL LIST GMBH, Graz (AT)

( * ) Notice: Subject to any disclaimer, the term of this patent is extended or adjusted under 35 U.S.C. 154(b) by 300 days.

(21) Appl. No.: 15/303,278

(22) PCT Filed: Apr. 7, 2015

(86) PCT No.: PCT/EP2015/057516
§ 371 (c)(1),
(2) Date: Oct. 11, 2016

(87) PCT Pub. No.: WO2015/155184
PCT Pub. Date: Oct. 15, 2015

(65) Prior Publication Data
US 2017/0037959 A1    Feb. 9, 2017

(30) Foreign Application Priority Data
Apr. 11, 2014    (DE) .................. 10 2014 005 398

(51) Int. Cl.
*F16H 61/02*    (2006.01)
*F16H 61/68*    (2006.01)
(Continued)

(52) U.S. Cl.
CPC ......... *F16H 61/0213* (2013.01); *F16H 61/68* (2013.01); *G01M 13/022* (2013.01);
(Continued)

(58) Field of Classification Search
None
See application file for complete search history.

(56) References Cited

U.S. PATENT DOCUMENTS 5,226,351 A * 7/1993 Matsuoka ........... F16H 61/0213
477/121
5,233,888 A * 8/1993 Fukuda ............... B60W 10/06
477/30
(Continued)

FOREIGN PATENT DOCUMENTS

CN    101479508    7/2009
CN    102257296    11/2011
(Continued)

OTHER PUBLICATIONS

Notification of Second Office Action (Including Translation) for corresponding Chinese Patent Application No. 201580019070.4, dated Jul. 12, 2018.
(Continued)

*Primary Examiner* — Justin Holmes
(74) *Attorney, Agent, or Firm* — Jason H. Vick; Sheridan Ross, PC

(57) ABSTRACT

A method for evaluating a transmission device using various characteristic values, wherein said characteristic values can be determined by means of variable or constant parameters.

13 Claims, 9 Drawing Sheets

Figure 1:
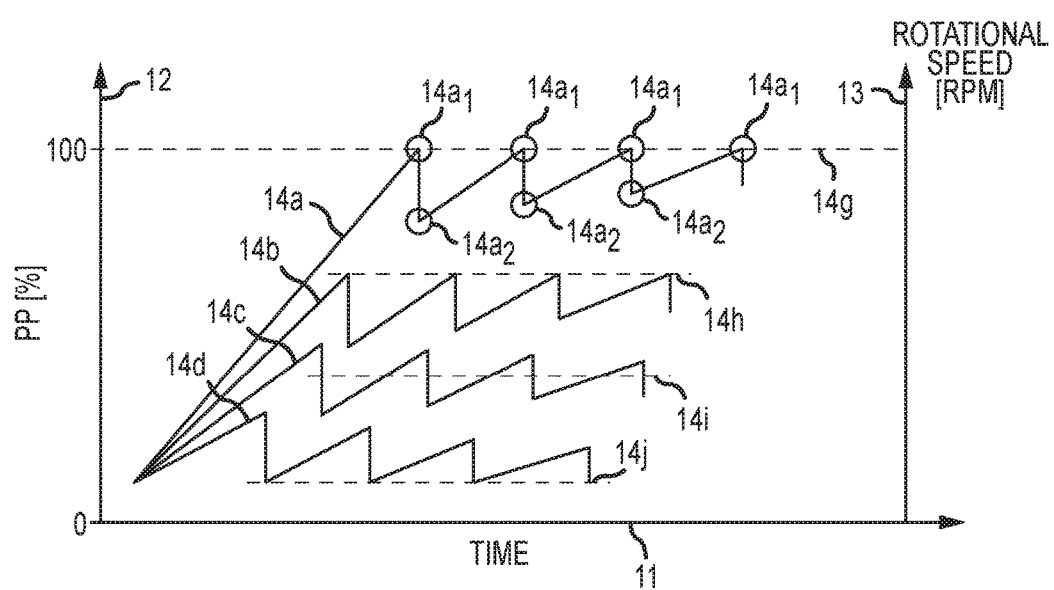

(51) Int. Cl.
*G01M 13/022* (2019.01)
*F16H 59/48* (2006.01)
*F16H 61/00* (2006.01)

(52) U.S. Cl.
CPC ...... *F16H 59/48* (2013.01); *F16H 2061/0068* (2013.01); *F16H 2061/0216* (2013.01)

(56) References Cited

U.S. PATENT DOCUMENTS

| | | | |
|---|---|---|---|
| 2009/0259374 A1 | 10/2009 | Weber et al. | |
| 2011/0237393 A1 | 9/2011 | Mair | |
| 2012/0310497 A1* | 12/2012 | Haneda | F16H 61/0202 701/52 |
| 2013/0060434 A1* | 3/2013 | Kiuchi | B60W 10/06 701/56 |

FOREIGN PATENT DOCUMENTS

| | | |
|---|---|---|
| DE | 38 27 091 A1 | 3/1989 |
| DE | 10 2004 038 362 A1 | 3/2005 |
| DE | 10 2004 061 079 A1 | 6/2006 |
| DE | 10 2005 022 314 A1 | 11/2006 |
| DE | 10 2007 006616 B3 | 5/2008 |
| DE | 602 24 073 T2 | 12/2008 |
| DE | 10 2008 000 483 A1 | 9/2009 |
| EP | 0 097 765 A2 | 1/1984 |
| EP | 0 744 565 A2 | 11/1996 |
| EP | 0 846 945 B1 | 6/1998 |
| WO | WO 2008/138886 A2 | 11/2008 |
| WO | WO 2010/031645 A1 | 3/2010 |

OTHER PUBLICATIONS

International Search Report and Written Opinion prepared by the European Patent Office on Sep. 14, 2015, for International Application No. PCT/EP2015/057516.

Search Report prepared by the German Patent Office on Mar. 12, 2015, for German Application No. 10 2014 005 298.9.

International Report on Patentability (English translation) for International (PCT) Patent Application No. PCT/EP2015/057516, dated Oct. 20, 2016, 16 pages.

Notification of First Office Action (Including Translation) for corresponding Chinese Patent Application No. 201580019070.4, dated Nov. 13, 2017.

* cited by examiner

METHOD FOR EVALUATING THE SHIFTING BEHAVIOR OF A MOTOR VEHICLE TRANSMISSION

CROSS REFERENCE TO RELATED APPLICATIONS

This application is a national stage application under 35 U.S.C. 371 and claims the benefit of PCT Application No. PCT/EP2015/057516 having an international filing date of 7 Apr. 2015, which designated the United States, which PCT application claimed the benefit of German Patent Application No. 10 2014 005 398.9 filed 11 Apr. 2014, the disclosure of each of which are incorporated herein by reference in their entirety.

The present invention relates to a method for evaluating or optimizing the shifting behavior of a transmission, a motor vehicle transmission in particular. The invention will be described by way of example in the following in the context of a method for evaluating the shifting behavior of an automatic or automatically shifted motor vehicle transmission.

Significantly higher demands are placed on the technical quality of a motor vehicle today than was customary 10 or 20 years ago. On the one hand, this relates to fuel consumption and emission values, on which legislators have set strict limits for today and for the future. On the other hand, vehicle buyers expect high driving comfort and particularly favorable NVH (Noise, Vibration, Harshness) characteristics. The sum total of these demands makes it necessary to optimally coordinate the individual components of a motor vehicle right from the early stages of its development.

To be able to assess the motor vehicle as a whole both on the road and during development on the test stand, the applicant proposed a method which is described e.g. in EP 0 846 945 B1. This method is performed in two steps: In a first step, the vehicle is driven on the road. In so doing, so-called driving conditions are defined for a plurality of possible driving maneuvers, the occurrence of same enabling the determination of engine-related data such as engine speed, throttle or gas pedal position, negative intake manifold pressure, coolant temperature, ignition timing, injection volume, lambda value, exhaust gas recirculation rate and exhaust gas temperature, and vehicle-related values such as vehicle speed and longitudinal vehicle acceleration. The values measured are compared to assessments made by experienced test drivers on the behavior of the vehicle under corresponding driving conditions. This on the one hand allows the calculating of an evaluation parameter for the vehicle behavior from the measured values which reflects the subjective feeling of a driver. On the other hand, it is possible to construct a simulation model from the acquired data with which the influence of various parameters on the driver's subjective perception can be calculated. By for example drawing on corresponding reference vehicle data, it is possible to assess the driving behavior of a vehicle under development from a very early stage of its development.

While EP 0 846 945 is primarily concerned with the relationship between engine and vehicle, increased attention has been focused on vehicle transmission design for some time now. In the past, it was generally accepted that vehicles equipped with automatic transmissions usually need half a liter or a whole liter more fuel at 100 km as the same vehicle with a manual transmission. Such increased consumption is no longer the case today. Automatic transmissions now having eight or more gear ratios instead of the previously standard three, four or five gears are increasingly being used today to lower consumption.

While in the past a vehicle manufacturer essentially had the choice between a manual and an automatic transmission with a torque converter, additional gear designs are available today including automated standard transmissions and dual-clutch transmissions. The problem of which transmission to select for a car and how specifically to calibrate it has therefore become much more complex today.

It is the task of the present invention to provide a method which enables the evaluation or optimization of transmissions both in the case of actual vehicles on the test stand as well as by way of simulation.

The invention accomplishes this with the teaching of the independent claim. Preferential further developments of the invention constitute the subject matter of the subclaims.

The method for determining at least one parameter for the evaluating or optimizing of a transmission device able to switch between a first and at least one second speed ratio applies in particular to motor vehicles. A transmission device to be analyzed thereby has at least one transmission input element and at least one transmission output element. The motor vehicle further comprises at least one drive unit connectable to the transmission device for conducting torque. The drive unit, in particular an internal combustion engine or an electric motor or a combination of at least one internal combustion engine and at least one electric motor, has a plurality of possible operating points. These operating points are at the least characterized by the torque output or input by the drive unit and the engine speed. Transmission control units are provided to control the shifting processes. The transmission's shifting processes are thereby controlled subject to the respective operating point and, if need be, subject to further parameters. These additional parameters specify constant and/or variable properties of the motor vehicle and its environment.

In a method according to the invention, changes to an operating point of the drive unit are effected by a predefined constant or variable target value specification and shifting processes thus induced in the transmission device. The process further determines at least one output parameter before and/or during and/or subsequent the shifting process. This output parameter is thereby characteristic of the engine speed behavior of the at least one transmission output element. To analyze the shifting processes, the progression of this output parameter is compared to a predefined, in particular ideal, output parameter progression. At least one parameter is determined from the deviations which is representative of said deviations.

As defined by the invention, a transmission device is to be understood as a device for the adapting/converting of the power provided by the drive unit(s), i.e. torque and speed, to overcome driving resistances. Preferably, the transmission device comprises a plurality of intermeshing, particularly shiftable, gear pairs, which can be introduced into or removed from the torque transmission path by shift control devices. Further preferably, the speed ratio of the transmission device is variable in a plurality of predetermined interrelationships, particularly by the geometrical relationships between the gear pairs.

As defined by the invention, the speed ratio of the transmission device is to be understood as the relationship of the rotational speed of the transmission input element to the rotational speed of the transmission output element. A transmission device can have a plurality of transmission input shafts and/or output shafts. In such a case, however, preferably not just those transmission input/output shafts which transfer most of the drive power in each case are to be understood as transmission input/output elements.

As defined by the invention, an operating point is to be understood as a working point of the drive unit able to be specified at least by a rotational speed at which a driven shaft of the drive unit turns and a torque to be transmit by said driven shaft. A plurality of operating points can be combined into one operating point line (characteristic curve).

As defined by the invention, the transmission control unit refers to a device for controlling the shifting processes in the transmission device. The transmission control unit thereby indicates at least the point in time at which the speed ratio of the transmission device changes as planned. Further preferably, a transmission control unit is to be understood as having a computer unit, in particular a CPU, a memory device, particularly a data memory, and in each case at least one albeit preferably multiple, data input lines and data outlet lines. The transmission control unit can be fully or partly integrated into another control device but can also be partitioned into multiple parts or modules.

Particularly preferentially, the transmission control unit is connected to the engine control unit and/or a bus system such as the CAN bus.

As defined by the invention, the drive unit is to be understood as the device which provides the drive power necessary to overcome the driving resistances. A drive unit can thereby have multiple drive motors, in particular one or more internal combustion engines and one or more electric motors.

As defined by the invention, "further parameters" refers to those which specify constant and/or variable properties of the motor vehicle. It is understood that such parameters at least include, in particular with respect to the drive unit or a combustion engine respectively:
piston displacement,
number of cylinders,
maximum torque,
engine speed upon reaching maximum drive speed,
maximum torque,
engine speed at maximum torque,
idling speed,
full speed,
power reduction factor,
type of internal combustion engine, in particular diesel or gasoline engine,
type of combustion air supply, aspirated engine, supercharged engine, in particular turbo or compressor.
With respect to the motor vehicle:
mass/total weight,
load capacity,
speed-dependent/independent roll resistance,
aerodynamic drag,
gas pedal position as of which an acceleration signal is transmitted to the drive unit,
gas pedal position as of which maximum acceleration is acquired,
type of vehicle,
maximum possible acceleration,
maximum vehicle speed.
With respect to the power train of the motor vehicle:
number of speed ratios, in particular gear ratios,
geometrical specification of the wheel/tire combination, in particular tire diameter,
axle ratio, in particular differential ratio,
numerical values for the individual speed ratios of the transmission device,
ratio of engine speed to vehicle speed [1/min/km/h].

With respect to the moments of inertia:
wheel/tire combination moment of inertia,
drive unit moment of inertia, in particular the combustion engine.
With respect to the gas pedal map:
assignment of a specific gas pedal position X to a specific operating point Y of the drive unit, particularly a certain drive torque.

In particular some, preferably all of the aforementioned parameters are established on the basis of virtual models.

The gas pedal map is particularly important during development, since the behavior of the drive unit, in particular the internal combustion engine, can thereby be simulated in this map without it needing to be present for that purpose. Particularly the speed/torque behavior of a drive unit, particularly the internal combustion engine, can be projected using calculation and simulation models. Preferably, this precalculated operational behavior of the drive unit is used in generating the gas pedal map.

As defined by the invention, upshifting is to be understood as changing from a speed ratio n to a speed ratio n+1, whereby n depicts the number of activated speed ratios or the engaged gear respectively. In an actual vehicle or actual transmission device respectively, this process corresponds for example to changing from 1st into 2nd gear, etc.

As defined by the invention, downshifting is to be understood as changing from a speed ratio n+1 to a speed ratio n, whereby n depicts the number of activated speed ratios or the engaged gear respectively. In an actual vehicle or actual transmission device respectively, this process corresponds for example to changing from 3rd into 2nd gear, etc.

Such parameters are to be understood as also including the shifting characteristics, in particular the characteristic upshift curve or the characteristic upshift curve, respectively upshift map (changing from speed ratio n to speed ratio n+1, in particular shifting gears from 1st into 2nd gear, etc.). The shifting characteristics are thereby preferably indicated particularly for each individual gear change (k=number of available speed ratios) in relation to the position of the gas pedal. A transmission device with k=8 speed ratios (gears) results in (k−1)=7 discrete gear shift characteristic curves (1-2, 2-3, 3-4, 4-5, 5-6, 6-7, 7-8).

This is correspondingly also applicable to transmission devices having more or fewer speed ratios. At which vehicle speed upshifting is initiated by the transmission control unit is determined for each gas pedal position in relation to a specific engaged gear. From this determination in the form of a three-dimensional data point (gear shift point, gas pedal position, time lag) and a plurality of these data points, a map of the gearshift characteristics is preferably constructed. As defined by the present invention, the terms speed ratio, shift stage and gear are substantially used equivalently. The phrasing of a speed ratio being activated refers to the transmission device transferring drive power at this speed ratio from the drive unit or the transmission device transferring drive power at this speed ratio to the drive unit.

As defined by the invention, the characteristic downshift curve or characteristic backshift curve are such lines in a map which indicate at which speed shifting occurs from a speed ratio n+1 to a speed ratio n, thus for example for a gear change from the 5th into the 4th or from the 4th into the 3rd gear, etc.

The method according to the invention can be devised such that one of the above-cited parameters expresses the time lag between the transmission control unit signal output to the start of the gear change. In particular, this lag is depicted in the form of a map. Preferably, a separate map is also stored for each shifting process (speed ratio change), particularly preferably, multiple or all of these characteristic curves form the map for the time lag. Preferably, the time lag is indicated as a function of the gas pedal position. Preferentially, a three-dimensional data point (gear change, gas pedal position, time lag) thereby results and a plurality of these data points characterize the map for the time lag of the shifting process.

In one preferential embodiment, the method is devised such that the shift period is used as one of the above-specified parameters. The shift period is thereby to be understood as the period of time needed to realize a gear change in the transmission device. Preferably, the shift period is also stored in the form of a map. It is also preferential here for a separate map to be stored for each shift process (speed ratio change). Preferably, multiple or all of these characteristic curves form the map for the shift period. Preferably, the shift period is indicated as a function of the gas pedal position. Preferentially, a three-dimensional data point (gear change, gas pedal position, time lag) thereby results and a plurality of these data points characterize the map for the shift period.

Preferably, the above-cited maps or data points respectively are not only stored for the upshift processes, thus particularly a change of gear from n to n+1, but similarly also for the downshifting, this from n to n−1, and are used in the analysis, evaluation and/or the optimization of the transmission device.

In one embodiment, the method is devised such that the brake-specific fuel consumption (BSFC) is used as one of the above-cited parameters in the form of at least one, preferentially a plurality of data points and particularly as a map. The specific fuel consumption thereby correlates the fuel consumption, particularly in grams or liters, with the resultant amount of energy provided, particularly in kilowatt-hours, relative to the rotational speed of the drive unit and the torque thereby yielded. Preferably, also negative drive unit torques, the resultant reversal of power flow at unchanging rotational speed, can be taken into account. A negative drive torque can thereby be documented with a value of 0 for the fuel consumption, this would be applicable in the case of the so-called overrun fuel cut-off of an internal combustion engine, or a numerical value for energy recovery potentials can be stored for recuperative operation, particularly of an electric motor. Preferably, the specific fuel consumption is used as a three-dimensional data point or as a plurality of three-dimensional data points (drive unit torque, drive unit speed, fuel consumption per energy unit).

In one preferential embodiment, the characteristic value is calculated for the inventive method from a first so-called base value and a second so-called adjustment factor. Preferably, the value satisfies the calculation rule:

$$DR_{final} = DR_{base} + (10 - DR_{base}) \cdot \text{adjust}_{factor}$$

In the above-specified calculation rule, $DR_{final}$ represents the parameter determined for the evaluation. $DR_{base}$ represents a characteristic number between the values of 1 and 10 for a transmission device property to be analyzed. Tests have shown that for some parameters, adapting them over the range of values dictated for same is of advantage. The "adjust$_{factor}$" (adjustment factor) in the above algorithm serves to adapt the calculations. This adjustment factor in particular makes it possible to weigh different parameters differently for an overall assessment, the method for determining a parameter being in particular improved thereby.

In one preferential embodiment of the invention, at least the rotational speed of the drive unit or preferably the rotational speed of the transmission input element prior to the upshift or downshift process and after said shifting process is determined and evaluated in order to determine a characteristic value (upshift speed characteristic value). Preferably, this rotational speed is monitored immediately before and immediately after the shifting process. "Immediately before" the shifting process thereby means that the speed is at least monitored at that point in time when the shifting process initiates as planned. Further preferably, the speed is monitored for at least one second, preferentially 0.25 seconds and particularly preferably 0.1 seconds prior to the shifting process. "Immediately after" the shifting process thereby means that the speed is monitored at least at that point in time when the shifting process terminates as planned. Further preferably, the process speed is monitored for up to 0.1 seconds, preferentially up to 0.25 seconds and particularly preferentially up to 1 second following the shifting process.

Preferably, the position of the gas pedal is maintained/preset as a constant during this speed monitoring. Preferably, multiple calculations are performed with respectively different (constant) gas pedal positions. Further preferably, the vehicle speed is preset at 0 (vehicle at standstill) at the beginning of the monitoring. As result of these defaults, the vehicle accelerates up until the time at which the drive power of the drive unit corresponds to the sum total of the driving resistances. During this vehicle acceleration procedure, the transmission device, initiated by the transmission control unit, performs various discrete speed ratio changes (upshift processes). Preferably, the position of the gas pedal is preset such that multiple, albeit preferably at least three or preferentially more than three, particularly four, five, six or seven upshift processes are performed. The number of upshift processes depends in particular on the vehicle configuration and the driving conditions. Preferably, the difference in rotational speeds between the speed of the transmission input element of the n-th speed ratio and the n+1 speed ratio is provided for the calculating of the characteristic value. By so doing, different types of speed differentials can be calculated, in particular the respective rotational speed difference at the start, thus immediately prior to the shifting process, and the respective rotational speed difference at the end, thus immediately following the shifting process.

Preferably, a summation is made of all the previously calculated speed differences or at least all of similar type (speed difference prior to the shifting process or speed difference subsequent the shifting process) for the calculating of the characteristic value. Further preferably, the speed differences are correlated to the number of shifting process realized. Further preferably, a characteristic value is determined for the speed difference which satisfies the following calculation rule:

$$\Delta n = \frac{\sum_{i=1}^{s-1} (n_i - n_{i+1})^2}{s}$$

In this calculation rule, n, represents the aforementioned rotational speeds for calculating the difference before/after the shifting process and s indicates the number of shifting processes realized.

The $DR_{base}$ value is then specified by assigning the determined speed difference $\Delta n$ to a numerical value, preferably from an allocation table. A lower speed difference Δn value thereby signifies good shifting behavior, the greater the speed difference Δn, the worse the shifting behavior of the transmission device. "Good shifting behavior" in conjunction hereto is thereby to be understood as shifting behavior which has been subjectively perceived as positive by a good number of drivers.

Because the speed difference is determined on all shifting processes realized, the sequence of all the shifting processes can be determined for a specific gas pedal position, thus providing a simple method for determining a characteristic shifting process value, which leads to values of high informative value.

In one preferential embodiment of the method, at least one, preferentially two adjustment factors are determined for this characteristic value (upshift speed characteristic value).

Preferably, a first adjustment factor is determined on the basis of the average rotational speed. Average rotational speed in this sense refers to that resulting as the average of all the speeds used in calculating the characteristic value $DR_{base}$. This first adjustment factor is selected from a range of values which starts at 0 and preferably ends at 1, preferentially at 0.5 and particularly preferentially at 0.3. Further preferably, a high average rotational speed is associated with a high adjustment factor. In this sense, a high average speed value is a rotational speed of preferentially 15000 1/min or less, preferentially 12000 1/min or less and particularly preferentially 9000 1/min or less.

In a particularly preferential embodiment, the adjustment factor is selected with the aid of the following table:

| Rotational speed | Adjustment factor |
|---|---|
| 1000 | 0 |
| 2000 | 0.02 |
| 3000 | 0.05 |
| 4000 | 0.1 |
| 5000 | 0.15 |
| 6000 | 0.2 |
| 7000 | 0.25 |
| 8000 | 0.28 |
| 9000 | 0.3 |

Preferably, a low average rotational speed is associated with a low adjustment factor, preferably an average speed of less than 2000 1/min is assigned the adjustment factor of 0.02 or less, preferentially an average speed of 1500 1/min or less is assigned an adjustment factor of 0.015 or less, and particularly preferentially, an average speed of 1000 1/min or less is assigned an adjustment factor of 0.

Further preferably, rotational speeds determined between the highest and the lowest average speeds are assigned intermediate values between the highest and the lowest adjustment factor.

A further adjustment factor for rotational speed differences is preferably determined on the basis of the least error square. Preferably, this second adjustment factor is determined based on the following correlations:

$$\text{trend} = \frac{std(n)}{R^2}$$

$$R^2 = 1 - \frac{SS_{err}}{SS_{tot}}$$

whereby $$SS_{tot} = \sum_i (n_i - \bar{n})^2,$$

$$SS_{err} = \sum_i (n_i - f_i)^2$$

and std: standard deviation

With the method according to the invention, it is possible to measure the technical functioning of the transmission with transmission control or the technical functioning of a combination of drive unit and transmission respectively and perform an evaluation based on the measured values. The inventive method is therefore suited, for example, to comparing different types of transmissions, transmission controls or differently designed transmissions. Preferably, a "trend" value less than 250 is assigned the adjustment factor of 0.2, preferentially a "trend" value of 100 or less and particularly preferentially a trend value of 0. Further preferably, a "trend" value of 6000 or less is assigned an adjustment factor of 0.01, further preferably, a "trend" value of 5000 or less is assigned an adjustment factor of 0.01 and particularly preferentially, a "trend" value of 3000 is assigned an adjustment factor of 0.01. Preferably, intermediate values of the adjustment factor are assigned to the "trend" values lying between the highest "trend" value and the lowest "trend" value.

Preferably, the two previously determined adjustment factors are added to adjust$_{factor}$ for calculating the $DR_{final}$ value. Further preferably, the added adjustment factor adjust$_{factor}$ is 0.4 or less. Particularly determining characteristic value for the rotational speed differences in the manner as described results in a particularly representative value and thereby being able to characterize the transmission device particularly well.

In one preferential embodiment, a value (upshift/gear period value) is calculated for the period(s) of individual speed ratios during a specific operational cycle, particularly an acceleration process with constant gas pedal position. Further preferably, the acceleration process starts from vehicle standstill (vehicle speed of 0) and preferably ends at that time when the maximum possible speed at that gas pedal position is reached. Further preferably, the period in which the first speed ratio is activated, thus particularly the first shift stage or first gear, is not factored into this calculation.

Preferably, an exponential function is used to calculate the characteristic value and this value is determined on the basis of the following correlations:

$$a = \frac{t_2}{\exp b}$$

whereby $t_2$: time interval during which the second speed ratio is activated $$b = \frac{1}{\log\left(\frac{t_2}{t_{letzter}}\right)}$$

whereby $t_{last}$: time interval during which the last upshift speed ratio is activated $$y = a \cdot \exp b$$

The time differential Δt can be determined therefrom at the following relationship:

$$\Delta t = 10 \cdot \sum \frac{\text{abs(time the speed ratio is activated} - y)}{\text{max(time a speed ratio is activated)}}$$

The $DR_{base}$ value for the property of how long a speed ratio of the transmission device is activated is determined on the basis of base Δt. The "10" factor in the above calculation rule is thereby a constant which preferably serves in scaling the "Δt" sum. Preferably, the scaling is provided with a different factor from "10", particularly preferentially with "1". Preferably, a high value of Δt is assigned a low $DR_{base}$ value. Preferably, a value of Δt which is less than 0.6, preferentially less than 0.5 and particularly preferentially less than 0.3 is assigned a $DR_{base}$ value of 0. Further preferably, a value of Δt which is greater than 5.6, preferentially greater than 10 and particularly preferentially 100 or greater is assigned a $DR_{base}$ value of 1. Further preferably, Δt values between this highest and lowest value are assigned a $DR_{base}$ value between the highest and lowest assigned $DR_{base}$ values. In a particularly preferential embodiment, the adjustment factor is selected with the aid of the following table:

| Δt | $DR_{base}$ |
|---|---|
| 0.0 | 10 |
| 0.6 | 9 |
| 2.6 | 7.15 |
| 3.5 | 6.4 |
| 4.3 | 5.8 |
| 5.6 | 5 |
| 100.0 | 1 |

Further preferably, an adjustment factor is calculated for this value (upshift/gear period value) which specifies the transmission device property of how long a speed ratio or the individual speed ratios respectively is/are activated during an acceleration process. Preferably, this adjustment factor is selected from a range which is greater than 0 and preferably less than 2, preferentially less than 1 and particularly preferentially 0.2 or less.

Particularly the calculating of a characteristic value for the length of time over which individual speed ratios are activated, or over which a gear or a shift stage is engaged respectively, enables particularly simple characterizing of this transmission device property and provides an improved method for the evaluation.

In one preferential embodiment, a value (upshift/start/speed value) is further calculated for the rotational speed of the drive unit at the beginning of the shifting process and for an expected speed of the drive speed, whereby this expected speed is yielded by the position of the gas pedal. In calculating this value, preferably both the gas pedal position as well as the drive unit speed are normalized. Further preferably, this value is determined on the basis of the following calculation rule:

$$pedal_{ref\ norm} = \frac{pedal - pedal_{min}}{pedal_{max} - pedal_{min}}$$

whereby $pedal_{ref\ norm}$: normalized pedal position pedal: current pedal position (constant pedal position default)

$pedal_{min}$: minimum gas pedal position at which the vehicle still experiences positive acceleration (greater than 0)

$pedal_{max}$: maximum gas pedal position value (100%)

The normalized speed of the transmission input element ($n_{shift\ ref\ norm}$) is a function of the gas pedal (pedal) position. The maximum possible drive unit speed is indicated by $n_{max\ abs}$. Preferably, this maximum speed is dictated by a preset value of the speed limiter.

The $n_{min\ abs}$ speed indicates the lowest speed of the transmission input element at which this speed ratio remains selected by the transmission control or transmission control unit respectively. In other words, if the speed of the transmission input element continues to drop further, the transmission control unit would preferably initiate a change in the speed ratio.

Based on the two $n_{max\ abs}$ and $n_{min\ abs}$ speeds, the speed range, identified as $n_{range\ abs}$, can be specified. To determine the speed range, speed $n_{min\ abs}$ is subtracted from speed $n_{max\ abs}$.

The lowest speed at which shifting by the transmission control device can still be initiated is identified as $n_{shift\ min\ def}$. This speed results from boundary condition-defining parameters of the internal combustion engine and the transmission device.

For calculating this value (upshift/start/speed value), a normalized speed difference $\Delta n_{norm}$ is determined, preferably determined with the aid of the following calculation rules:

$$n_{shift-ref-abs} = n_{min\ abs} + n_{shift\ ref\ norm} \cdot n_{range\ abs}$$

$$n_{shift\ abs} = n_{shift\_start}$$

$$\Delta n_{abs} = n_{shift\ abs} - n_{shift-ref-abs}$$

$$\Delta n_{norm} = \frac{\Delta n_{abs}}{n_{range\ abs}}$$

Preferably, the speed difference $\Delta n_{norm}$ determined is assigned value $DR_{base}$.

Further preferably, the $n_{shift\ ref\ norm}$ speed can be preset as a function subject to the gas pedal position ($pedal_{ref\ norm}$) and additionally from values stored in a table. This specification enables the determining of a particularly energy-efficient operating mode of the transmission device, or a particularly sporty or comfortable operating mode, respectively vehicle manufacturer objectives can be reached.

In one particularly preferential embodiment, $DR_{base}$ values are assigned to the speed differences $\Delta n_{norm}$ determined based on the following table:

| $\Delta n_{norm}$ | $DR_{base}$ |
|---|---|
| 0 | 10 |
| 0.035 | 9.5 |
| 0.07 | 8 |

| $\Delta n_{norm}$ | $DR_{base}$ |
|---|---|
| 0.104 | 7 |
| 0.174 | 6 |
| 0.348 | 5 |
| 0.522 | 4 |
| 0.696 | 3 |
| 0.9 | 2 |

In one particularly preferential embodiment, the speed $n_{shift\ ref\ norm}$ is freely configurable such that various characteristics can be specified with the speed, preferably an energy-efficiency mode or a sport mode. Preferably, the $n_{shift\ ref\ norm}$ speed depends on the normalized pedal position $pedal_{ref\ norm}$ and on data points preferably able to be predefined in tabular form.

In one preferential embodiment, an adjustment factor is determined for the value (upshift/start/speed value) of the drive unit speed at the start of the shifting process and for an expected drive speed value. Preferably, this adjustment factor is selected from a range, with the range preferably being greater than or equal to 0 and further preferably the range being less than 1, preferentially less than 0.5 and particularly preferentially 0.3 or less. Preferably, the speed $n_{shift\ start}$ of the transmission input element at the start of the shifting process is used in determining the adjustment factor.

In one preferential embodiment, the value (upshift/start/speed value) is determined without a further adjustment factor. Preferably, at least the vehicle acceleration before and/or after the speed ratio change is also disregarded in this method of calculating the value. Further preferably, no adjustment factor is determined for the different speeds, particularly within the range between 1000 9000 1/min. This procedure enables eliminating a mixture of individual value calculations and determining individual values of particularly high informative value and thereby providing an improved evaluation method.

Preferably, low transmission input element speeds are in this sense assigned a low adjustment factor and high speeds a high adjustment factor. In this context, a high transmission input element speed refers to a speed of preferably higher than 5000 1/min, preferentially higher than 7500 1/min and particularly preferentially higher than 9000 1/min. Further preferably, a low drive speed is a speed of the transmission input element which is lower than 2500 1/min, preferentially lower than 1500 1/min and particularly preferentially 1000 1/min or less.

In one preferential embodiment, a characteristic value (downshift/acceleration value) for the attainable or ideal acceleration of the vehicle is calculated. In this sense, this ideal acceleration is preferably to be understood as a linear correlation of the vehicle acceleration and the position of the gas pedal. In particular, discrete speed ratios, thus particularly the given limited number of transmission device shift stages, yield deviations of the actually attainable vehicle acceleration at a predefined pedal position from the ideal vehicle acceleration. The value for the vehicle's ideal vehicle acceleration preferably characterizes the degree of deviation between the actual vehicle acceleration attainable with this transmission device and the ideal vehicle acceleration. In particular the determining of this value enables a particularly simple evaluating of the transmission device and thus provides an improved method for the evaluation of a transmission device and for determining a characteristic value for the ideal acceleration.

In one preferential embodiment, the characteristic value (downshift/acceleration value) for the ideal vehicle acceleration can be determined on the basis of the following calculation rules:

$$a_{ref\ norm\ (pedal)} = \frac{pedal - pedal_{min}}{pedal_{max} - pedal_{min}}$$

$$a_{norm} = \frac{a(pedal) - a_{min\ ref}}{a_{max\ ref} - a_{min\ ref}}$$

whereby:

$$pedal_{min} \leq pedal \leq pedal_{max}$$

$$Area = \frac{\sum_{pedal=pedal_{min}}^{pedal=pedal_{max}} abs(a_{ref\ norm(pedal)} - a_{norm(pedal)})}{pedal_{max} - pedal_{min}}$$

Preferably, a linear function results for function $a_{ref\ norm(pedal)}$ (linear slope between 0 and 1).

Preferably, this calculated "area" value is assigned a $DR_{base}$ value. Preferably, smaller "area" values are assigned a large value and larger calculated "area" values are assigned a small value. Preferably, a small "area" value is to be understood as a range of values preferably greater than 0, preferentially greater than 0.005 and particularly preferentially greater than or equal to 0.01; further preferably this is to be understood as including a range preferably less than 0.05, preferentially less than 0.03 and particularly preferentially less than or equal to 0.02. Preferably, a large "area" value is to be understood as a range of values preferably less than or equal to 1 and preferably greater than or equal to 0.5, preferentially greater than 0.6 and particularly preferentially greater than 0.7.

In a particularly preferred embodiment, a $DR_{base}$ value is assigned to the calculated "area" value based on the table depicted below.

| Area | $DR_{base}$ |
|---|---|
| 0.01 | 10 |
| 0.05 | 9.5 |
| 0.1 | 8.3 |
| 0.15 | 7.3 |
| 0.3 | 5.2 |
| 0.5 | 3.6 |
| 1 | 1 |

In one preferential embodiment, a value (speed ratio/active value) is determined for the activation time of a speed ratio. The activation time in this context refers to the period starting from when a speed ratio is activated, particularly starting from when it is activated by downshifting (change from speed ratio n+1 to n; thus e.g. shifting from fourth into third gear). The activation time ends upon the next upshifting following the downshift, thus the speed ratio change from n to n+1 (e.g. shifting from third into fourth gear). Preferably, a long speed ratio activation period is better evaluated than a short period. Preferably, the activation period is determined with the gas pedal in a constant position. Further preferably, the characteristic value for the activation period is determined with the aid of the calculation rules depicted below:

$$\Delta v = f(\text{vehicle configuration})$$

$$\Delta t(v, \text{pedal}) = \frac{\frac{\Delta v}{3,6}}{a(v, \text{pedal})}$$

$$t_{active}(\text{pedal}) = \sum_{v=v_{downshift}(pedal)}^{v_{upshift}(pedal)} \Delta t(v, \text{pedal})$$

Preferably, speeds are indicated in this context in the unit of kilometers per hour [km/h] and accelerations in the unit of meters per second squared [m/s$^2$]. Preferably, large values for $t_{active(pedal)}$ are assigned large $DR_{base}$ values and small values for $t_{active(pedal)}$ small $DR_{base}$ values. Preferably, large values for $t_{active(pedal)}$ refers to a range of values preferably greater than 2.5 seconds, preferentially greater than or equal to 3 seconds and particularly preferentially greater than or equal to 5 seconds; further preferably, small values for $t_{active(pedal)}$ are from a range lower than 0.5 seconds, preferentially lower than 0.2 seconds and particularly preferentially lower than or equal to 0.1 second.

In a particularly preferential embodiment, a $DR_{base}$ value is assigned to the calculated $t_{active(pedal)}$ value based on the table depicted below.

| $t_{active(pedal)}$ | $DR_{base}$ |
|---|---|
| 0.1 | 1 |
| 0.5 | 5 |
| 1.0 | 6.2 |
| 1.7 | 7.5 |
| 2.0 | 8.0 |
| 2.5 | 9.0 |
| 3.0 | 10 |

In one preferential embodiment, at least one value is determined for the acceleration potential of the vehicle. Preferably, the acceleration potential refers to accelerations of the vehicle from low drive unit speeds. In the sense of the invention, and the acceleration potential in particular, a low drive speed is to be understood as a drive speed which preferably amounts to 75% or less of the maximum speed of the drive unit, preferentially 50% or less and particularly preferentially 30% or less of said speed. Further preferably, an acceleration for evaluating the acceleration potential begins at least in one of these ranges, further preferably such an acceleration occurs entirely in one such range.

As defined by the invention, the acceleration potential refers to the vehicle property of realizing an acceleration at a specified constant gas pedal position without the speed ratio in the transmission device changing. Preferably, this acceleration at least begins at a low engine speed. Preferably, this is to be understood as including a type of shifting process hysteresis so that excessively frequent speed ratio changes can be prevented or reduced.

In particular, such a value for the acceleration potential is calculated without downshifting (pre-downshift acceleration potential value). Particularly the downshifting of the transmission device into a lower speed ratio generally allows an increasing of the vehicle's acceleration power, however vehicle occupants frequently perceive this as being unpleasant such that passengers assess the greatest possible acceleration potential of the vehicle without a change in gears as being better than a lower acceleration potential. Preferably, several values are determined for different acceleration potentials. Preferably, at least one value is determined for the acceleration potential prior to downshift and subsequent upshift.

Preferably, the vehicle property of switching from a stationary driving condition into a transient driving condition is determined with at least one, preferably with a plurality and particularly preferentially with all of these acceleration potential values; to hereby be understood by a stationary driving condition is vehicle travel at an unchanging, thus constant velocity or a vehicle standstill. A transient driving condition refers to vehicle travel of increasing speed. Preferably, the gas pedal position is constant for the determination of at least one, preferably all of these characteristic acceleration potential values.

Preferably, the period for determining the acceleration potential value begins prior to downshifting at the time at which the vehicle has reached the lowest possible travel speed of the activated speed ratio (engaged gear) before the transmission control unit initiates a downshifting, and ends after a constant value preset for the gas pedal elicits an acceleration of the vehicle at a speed which is preferably 10 km/h, preferentially 20 km/h and particularly preferentially 30 km/h higher than the speed at which the process was started.

Preferably, a simplified model of the vehicle can be used for evaluating the above-cited acceleration potential values. A simplified model of the vehicle is in particular to be understood as a parameter-reduced model of the vehicle.

Preferably, calculation of the above-cited values for the acceleration potential is based on an integration or a numeric summation respectively of the above-cited speed range for determining these values. Preferably, the value depends on the ratio between the acceleration $a_{shift\ characteristic}$ (i) actually given at the specific moment at the activated speed ratio and the maximally attainable acceleration, particularly the acceleration which would be attainable if the drive unit was operating at its maximum performance point $a_{max\ power}$ (i). Here, "i" preferably represents a counter value for the numeric summation. Preferably, an acceleration ratio "ratio (i)" is formed from these two accelerations.

Preferably, the different acceleration "ratios (i)" are weighted with weighting factors over the calculation period. In particular, weighting the acceleration "ratios (i)" enables a particularly precise value determination, thereby making an improved method achievable.

Preferably, the sum total of the weighting factors in a summation step yields the value of 1. Preferably, the first weighting factor is substantially at least $w_{min}=\frac{1}{3}$, further preferably, the second weighting factor is substantially at least $w_{max}=\frac{2}{3}$. Further preferably, the weighting factor for the individual summation step is determined pursuant to the following relationship:

$$w(i) = w_{min} + (w_{max} - wmin) \cdot \frac{i-1}{n-1}$$

Further preferably, the "weighted ratio (i)" from the "ratio (i)" and associated weighting factor "w(i)" is determined by multiplication of the two. Preferably, the summation over the entire range is determined from the "weighted ratio (i)" in determining the value for the acceleration potential prior to downshift, the following mathematical model thereby preferably sufficing for the calculation:

$$\text{ratio}_{total} = \frac{\sum_{i=1}^{n} \text{weighted ratio }(i)}{\sum_{i=1}^{n} w(i)}$$

Here, n preferably expresses the number of the numerical summation steps.

In particular, an improved method for the determination of the acceleration potential value prior to downshifting enables a particularly precise characterization of the transmission device.

In one preferential embodiment, a value (absolute pre-downshift acceleration potential value) is determined for a target acceleration of the vehicle prior to downshifting. This value is calculated at a specific vehicle speed, whereby the vehicle speed is characterized in that a downshift is initiated (speed ratio change from n+1 to n) upon said vehicle speed decreasing further, particularly by the transmission control unit or the transmission control respectively. Particularly the selection of this operating point (just prior to downshift) enables recognizing that the drive unit is operating at a low speed.

Preferably, the acceleration actually achievable at this calculation point is compared to a target acceleration function. Preferably, the target function is thereby determined by evaluating accelerations achievable in comparable vehicles at similar operating points. Preferably, the target function is a freely configurable function.

Many drivers find it suitable/acceptable for the acceleration potential to decrease as speed increases. Preferably, the target function for the determination of this variable exhibits a decreasing, preferentially degressive gradient with increasing vehicle speed. Since this variable describes the acceleration potential at low engine speeds, the accelerations achievable with the vehicle, particularly in low gears, can be higher than this target function. Preferably, the full-load power of the drive unit and the maximum acceleration attainable with same can also be specified as the target function. Preferably, the maximum drive power which the drive unit is able to deliver on a sustained basis can also be referenced.

Further preferably, the distance between the performance achievable at this operating point, taking the activated speed ratio into account, and the above-described target function for the acceleration is calculated. A greater margin between the acceleration achievable with the vehicle, particularly allowing for the activated speed ratio, and the target function thereby means that the vehicle's acceleration potential is being more poorly utilized as would be the case if the disparity were less.

The acceleration able to be achieved at a specific activated speed ratio thereby depends particularly on the vehicle speed, since the wheel/tire combination of the vehicle is connected to the transmission device and the drive unit in substantially torsionally rigid manner by the axle drives and drive shafts.

In one preferential embodiment, a map is generated to determine this value, whereby different vehicle accelerations are determined and plotted in the map for different vehicle speeds. The $DR_{base}$ value is determined from the calculated vehicle accelerations in conjunction with the previously addressed target function.

In one preferential embodiment, the value for the potentially possible acceleration of the vehicle (post-upshift acceleration potential value) is further improved by means of an adjustment factor. Preferably, this adjustment factor is a function of the vehicle speed. Further preferably, the adjustment factor is selected from a range of values, whereby this range of values is preferably less than or equal to 1, preferentially less than or equal to 0.5 and particularly preferentially less than or equal to 0.3 and, further preferably, the range of values is greater than or equal to 0, preferably greater than or equal to 0.05 and further preferably greater than or equal to 0.1. Preferably, this adjustment factor is selected as a function of the vehicle speed. Further preferably, a lower adjustment factor is assigned to a lower vehicle speed and a higher adjustment factor is assigned to a higher vehicle speed. Preferably, the lowest adjustment factor is assigned to the driving speed of substantially 50 km/h and, further preferably, a driving speed substantially corresponding to the maximum speed of the vehicle is assigned the highest adjustment factor.

Such a value for the potential acceleration of the motor vehicle along with the adjustment factor in particular enables a particularly good characterization of the transmission properties and provides an improved method for evaluation of the transmission device.

In one preferential embodiment, a value (post-upshift acceleration potential value) is determined for the acceleration potential of the vehicle, in particular for the acceleration potential after upshifting (speed ratio change from n to n+1, e.g. shifting from 3rd into 4th gear). Particularly after the transmission device being shifted up into a higher speed ratio, the acceleration power of the vehicle decreases.

Due to this decrease in accelerating power, driving maneuvers in which the driver demands a greater vehicle acceleration (gas pedal position) than is possible at the speed ratio can occur. Such a driving maneuver leads to a downshift immediately following the upshift. Vehicle occupants usually perceive this immediate downshifting after upshifting to be unpleasant. There is therefore a need to evaluate the transmission device property having this potential so that such downshifting is not realized. In other words, this value is used to evaluate the acceleration potential available at the speed ratio activated after upshifting.

A high acceleration potential in particular is thereby perceived positively. Preferably, determined for a speed ratio is the relationship between the full-load acceleration possible at this speed ratio and the acceleration attainable at this speed ratio subsequent upshift. Preferably, the calculation is performed in the same way as with the calculation of the characteristic value for the acceleration potential prior to downshifting.

Preferably, the calculating of this value (post-upshift acceleration potential) begins immediately after the upshifting process, preferentially, the calculating of this value begins at a certain interval subsequent upshift, particularly preferentially, the calculating begins 4 km/h after the upshifting has completed. To determine this value, the position of the gas pedal is predefined such that it leads to an acceleration of the vehicle. Preferably, this procedure is repeated or repeatedly calculated respectively for different positions of the gas pedal.

The range for determining the post-upshift acceleration potential value preferably ends 15 or more km/h after this period begins, preferably 20 or more km/h and particularly preferentially 30 or more km/h after the start of the value calculation. The end of the interval is thereby to be understood as that point in time at which the vehicle, or the virtual model of the vehicle respectively, exits the range for determining the value by virtue of the vehicle acceleration. The gas pedal value is a constant specification.

Preferably, a simplified model for the vehicle can be used for calculating the above-cited acceleration potential values. A simplified model for the vehicle refers in particular to a parameter-reduced model of the vehicle.

The calculation of this value is thereby based on the same fundamentals as the calculation of the value for the pre-downshift acceleration potential.

An adjustment factor is preferably also determined for the post-upshift acceleration potential value. Preferably, the calculation of this adjustment factor corresponds, at least systematically, to the calculation of the adjustment factor for the pre-downshift acceleration potential.

Particularly the type of determination of the post-upshift acceleration potential value as set forth provides a particularly applicable value for the transmission device properties due to the improved method for their evaluation.

In one preferential embodiment, a value (absolute post-upshift acceleration potential value) for the acceleration potential of the vehicle is determined subsequent upshifting in terms of a target function. This value is calculated at a specific vehicle speed, whereby this vehicle speed is characterized as being higher than those of the upshifting process. Preferably, this speed immediately after upshifting is preferentially 2 km/h and particularly preferentially 4 km/h higher than the upshift speed, i.e. the speed at which the shifting is initiated.

Preferably determined as described above is the acceleration actually achievable at this calculation point with the acceleration of the vehicle, dictated by the target function, preferably the target function for the acceleration potential. Further preferably, a ratio is formed from these two accelerations.

Further preferably, the gap between the performance attainable with this operating point, in consideration of the activated speed ratio, and the acceleration pursuant the target function is calculated. Preferably, the calculation of the value for the potentially possible post-upshift acceleration of the vehicle is oriented toward the calculation of the value for the potentially possible pre-downshift acceleration of the vehicle or, respectively, corresponds at least systematically to same.

In one preferential embodiment, the value for the potentially possible acceleration of the vehicle subsequent upshifting is further improved by means of an adjustment factor. Preferably, the calculation of this adjustment factor is oriented toward the calculation of the adjustment factor for improving the value for the pre-upshift acceleration potential or, respectively, corresponds at least systematically to same.

Particularly this type of value for the potential post-upshift acceleration of the vehicle with adjustment factor enables a particularly good characterization of the transmission properties and provides an improved method for the evaluation of the transmission device.

In one preferential embodiment, the inventive method calculates a value for the vehicle acceleration (vehicle acceleration value). Preferably, a set of calculation rules as depicted below is thereby used:

$$i_{total} = i_{transmission} \cdot i_{diff}$$

$$\text{factor}_{gbx} = i_{total} \cdot \theta_{total}$$

whereby $i_{total}$: total gear ratio, transmission ($i_{transmission}$) and axle ratio ($i_{diff}$)

$\theta_{total}$: efficiency $$F_{rr} = A_0 + B_0 \cdot v_{vehicle} + C_0 \cdot v_{vehicle}^2$$

The roll resistance ($F_{rr}$) thereby comprises a speed-independent component ($A_0$), a linear speed-dependent component ($B_0$) and a dependent component ($C_0$) squared by the speed of the vehicle ($v_{vehicle}$).

The inertial mass of the wheel/tire combination results from the following relationship:

$$m_{wheel/tire} = 4 \cdot \frac{J_{wheel/tire\_calculated}}{r_{wheel/tire}^2}$$

whereby $J_{wheel/tire\_calculated}$: mass moment of inertia of the wheel/tire combination r: wheel/tire combination radius The acceleration of the vehicle can be calculated as a characteristic value from these values with the calculation rule shown below:

$$a = \frac{M_{mot} - \dfrac{F_{rr} \cdot r_{wheel/tire}}{\text{factor}_{gbx}}}{J_{ICE-calculated} \cdot \dfrac{i_{transmission}}{r_{wheel/tire}} + \dfrac{(m_{vehicle} + m_{wheel/tire}) \cdot r_{wheel/tire}}{\text{factor}_{gbx}}}$$

whereby $J_{ICE-calculated}$: calculated or measured moment of inertia of the drive unit $M_{vehicle}$: vehicle mass $m_{rwheel/tire}$: mass of all the wheel/tire combinations on the vehicle $M_{mot}$: drive torque of the drive unit Particularly the vehicle acceleration value determined with these calculation rules can be determined for each speed ratio and constitutes a particularly representative value for the functionality of the transmission device.

In one preferential embodiment, at least one common value is formed from at least two, preferentially a plurality of the above-cited values for the evaluating of a transmission device. Further preferably, at least two common values are formed for the evaluating of the transmission device.

Preferably, the first of these two values is formed from a group of the previously-cited individual values, preferably from values $DR_{final}$ or $DR_{base}$ or from a combination of these values. Only those of the above-specified values with which in particular the position of the gas pedal is constant or is predetermined as constant are used for this first value. In the following, the $DR_{final}$ and $DR_{base}$ values will be indicated as the generalized $DR_n$ or $DR_i$. This is in particular expedient for the reason that such values are dependent on the position/default of the gas pedal. Multiple values can thereby be determined for multiple discrete pedal positions, for example for gas pedal position defaults at 10%, 20%, 30%, etc. of the maximum gas pedal position or other discrete values between 0 and 100%.

Preferably, at least those previously described individual values comprised in the following group of values are used in the forming of this first value:

upshift speed behavior
upshift gear period
upshift start speed
speed ratio—active Preferably, a second value is formed from a group of the previously-cited individual values, preferably from the $DR_{final}$ or $DR_{base}$ values or from a combination of the $DR_{final}$ and $DR_{base}$ values, these values as well are indicated in the following as $DR_n$ or $DR_i$. Only those of the above-specified values with which in particular the vehicle speed is constant or is predetermined as constant are used for this second value. This is in particular expedient for the reason that such values are dependent on the speed of the vehicle. Multiple values can thereby be determined for multiple discrete vehicle speeds, for example for vehicle speed defaults of 10%, 20%, 30%, etc. of the maximum vehicle speed or other discrete values between 0 and 100%.

Preferably, at least those previously described individual values comprised in the following group of values are used in the forming of this second value:
 downshift acceleration
 pre-downshift acceleration potential
 absolute pre-downshift acceleration potential
 post-upshift acceleration potential
 absolute post-upshift acceleration potential Individual values are preferably formed from a plurality of calculated values, for example an individual value/value can be determined for each shifting operation, these individual values are then summarized into one total value for a property/characteristic of the transmission device to be evaluated and preferably identified as $DR_p$.

Preferably, a separate total value $DR_p$, preferably thus $DR_{p\ upshift\ speed\ behavior}$ to $DR_{p\ abs.\ post\text{-}upshift\ acceleration\ potential}$ is calculated for each of the above-noted (nine) characteristic values ("upshift speed behavior" to "absolute post-upshift acceleration potential"). Further preferably, at least one of the total values is formed by summation of the individual values for the corresponding characteristic/property of the individual values of the transmission device.

Preferably, the $DR_{p\ upshift\ speed\ behavior}$ to $DR_{p\ abs.\ post\text{-}upshift\ acceleration\ potential}$ total values are weighted. Preferably, the individual values are exponentiated by the preset value p so that the common value can only be slightly better than the worst individual value. In one preferential embodiment, p assumes the value of 1. Particularly a value of 1 for p enables a mean value formation and all the values are integrated into the calculation equally weighted. Particularly a p=1 value enables the determining of a particularly simple total value.

In one preferential embodiment, p takes a value other than "1", preferably p greater than 1, preferentially p greater than 2 and particularly preferentially p greater than 3 and, further preferably, p takes a value less than or equal to 20, preferentially less than 15 and particularly preferentially 10 or less. Further preferably, p is selected so as to at least substantially correspond to the value of 7 or 10. "Substantially correspond" thereby refers to a range of +/−1.5.

Further preferably, at least one of the $DR_{p\ upshift\ speed\ behavior}$ to $DR_{p\ abs.\ post\text{-}upshift}$ acceleration potential total values, referred to below as $DR_p$ for simplification, is determined. $DR_p$ is thereby preferably determined for 1 to n individual values/calculation points ($DR_1$-$DR_n$), whereby n indicates the number of the values or individual calculations (e.g. number of gearshifts, speed stages, gas pedal positions, or other variable parameters), using the following calculation rule:

$$DR_p(DR_1, DR_2, \ldots DR_n) = 11 - \left(\frac{1}{n}\sum_{i=1}^{n}(11-DR_i)^p\right)^{\frac{1}{p}}$$

The number 11 in the above calculation rule is in particular conditional on the value range of the individual characteristic values (1 less than or equal to $DR_{base}$, respectively $DR_{final}$ less than or equal to 10; $1 \le DR_{base}$, $DR_{final} \le 10$) and is to be modified accordingly upon this value range being modified. Preferably, each $DR_i$ value corresponds to a $DR_{final}$ value or to a $DR_{base}$ value respectively in the calculation rule for determining $DR_p$, particularly when $adjust_{factor}=0$ applies to the adjustment factor.

Particularly the described manner of determining the total values for the individual properties/characteristics of the transmission device provides a value of high informative value for the evaluation of a transmission device.

In one preferential embodiment, a global value $DR_{pg}$ is determined from the total values using the calculation rule indicated above for $DR_p$. In place of value $DR_i$, the total value $DR_{p\ upshift\ speed\ behavior}$ to $DR_{p\ abs.\ post\text{-}upshift\ acceleration\ potential}$ is then used.

Further preferably, the global value is determined pursuant to its own calculation rule. Preferably, this calculation rule enables individual total values $DR_p$ to be weighted differently. In particular, this weighting enables a particularly good and particularly demand-oriented evaluation of the transmission device. Further preferably, the global value $DR_{pg}$ is determined from the total values $DR_p$ for 1 to I total values (with "I" the number of the $DR_p$ values) by means of the following calculation rule:

$$DR_{pg} = DR_p(DR_{k1}, \ldots DR_{kI})$$

$$DR_{pg} = 11 - \left(\frac{1}{\sum_{k=1}^{I} w_k} \cdot \sum_{k=1}^{I} w_k \cdot (11-DR_k)^p\right)^{\frac{1}{p}}$$

In the calculation rule for $DR_{pg}$, the $w_k$ factor represents the weighting factor for the individual total values; $w_k$ can be selected differently for each total value. Should individual total values not be integrated into the calculation, $w_k=0$ can be set. In the calculation rule for $DR_{pg}$, I expresses the number of the total values integrated into the calculation of the global value.

Particularly the calculation of a global value from preferably at least two, preferentially multiple and particularly preferentially all the $DR_p$ total values provides a value of high informative value for a complex transmission device.

The method according to the invention can be implemented in exactly the same manner in order to optimize a transmission for a specific application.

The inventive method can preferably be used on an actual vehicle, preferentially on a test stand, albeit particularly preferentially also within the scope of a simulation. Particularly when employing this method in a simulation, it is not necessary for the entire vehicle or even just individual component assemblies of the vehicle to be physically present, in fact it is thereby possible to evaluate the gear stages right during the development phase of the vehicle transmission.

When implementing the method on an actual vehicle, preferably all the parameters necessary for configuration are detected and monitored. Furthermore, all the measured values necessary for the evaluation are determined and preferably logged and either processed further and evaluated during the measurement itself (online measuring) or at a later time (offline measuring).

The inventive method can also be performed on the test stand. Here, the drive unit, or an engine which simulates the performance of the drive unit, and the transmission are arranged on a test stand and loaded by means of a preferably electric braking device or powered respectively in order to determine the overrun conditions. Here as well, all the measured values necessary for the evaluation are determined and preferably logged and likewise either processed further and evaluated during the measurement itself (online measuring) or at a later time (offline measuring).

The inventive method can however also be implemented within the course of a simulation. Preferably data records derived from measurements of an actual drive motor and an actual transmission and preferably also an actual vehicle are included in the process. These data records are modified for the simulation so as to correspond to the properties of a drive motor to be simulated and/or a transmission and/or a specific operational profile. It is thereby for example possible to compare different types of transmissions with a given drive motor in order to determine how the transmission needs to be calibrated, thus in particular how the speed ratios are to be selected so as to result in optimum properties for the respective vehicle. Such a simulation can be used to determine how engine and/or transmission property changes impact an already existing vehicle. However, the simulation can also be used in the developing of a new vehicle. In this case, comparative data from a reference vehicle is preferably used, for example from the vehicle's respective predecessor model, and it can then be determined how the engine and transmission need to be coordinated such that optimum driving characteristics can be expected.

The specifying of one or more target value(s) for the actual or simulated operation of a vehicle can be accomplished in a number of ways.

A preferential means for specifying the target value lies in the gas pedal, or the control corresponding to same on the test stand respectively, or in a corresponding data input and/or data specification to a computer system in which the behavior of the drive motor and the transmission is simulated.

The target value definition can for example reflect, beginning with an initial speed $v_0$ or the initial speed of 0, the gas pedal being brought into a position which corresponds for example to a certain percentage of the maximum position (e.g. wide open throttle valve). The vehicle then accelerates continuously until reaching a shift point and continues the acceleration with continual upshifting until the torque of the engine is so high that the driving forces on the driven wheels are in equilibrium with the driving resistance at the applicable speed.

In addition to a constant gas pedal position default, the pedal position can also be varied during the measuring process.

A target value definition can also be effected by the vehicle first being accelerated at a constant (or variable) gas pedal position until a specific speed and this speed then being maintained. This type of situation arises for example during highway overtaking when the transmission downshifts in order to allow higher acceleration. As soon as the vehicle returns to a constant speed again, the transmission upshifts so as to reduce consumption. In this case, the target value definition follows as a specification of a constant speed subject to the condition of this speed being in the optimum fuel-efficiency range.

The target value default can also follow from the road profile. When the default is travel at a constant speed, the transmission downshifts when the inclination requires a higher drive torque than that able to be attained at the given speed.

A target value default can also follow from a predefined operational profile with variable speeds, as is the case with the NEFZ (New European Driving Cycle) for example.

One preferential embodiment makes use of least one, preferentially multiple and particularly preferentially all of the previously determined values for the improvement, in particular optimization, of the transmission device. Preferably, at least one first set and one second set of individual values are calculated for the improvement of the transmission device. At least one, preferentially multiple shifting characteristics of the transmission device are modified for the second set of values. Preferably, the first characteristic values are compared to the second characteristic values, preferably employing total or global values.

Particularly the comparing of at least two sets of values for modified transmission devices provides an improved method for the optimizing of transmission devices.

Preferably, variable parameters of the transmission device, in particular the characteristics for upshift and downshift processes, are modified, preferably by a calculation program, particularly preferentially by a numerical optimization process, and most particularly preferentially by means of a generic algorithm. Preferably, the optimization is optimized using the known "differential evolution" method.

In one preferential embodiment, at least one, preferentially multiple boundary conditions are predefined for the calculations. Preferably, the boundary conditions are selected from a group of boundary conditions containing at least the following elements:

For the gas pedal position of 0%, i.e. in particular "idling" condition:
    vehicle speed hysteresis, particularly indicating lag between upshift and downshift characteristic, preferably in a distance/time unit, preferentially m/s and particularly preferentially km/h,
    minimum revolutions/speed of the drive unit for an active transmission device speed ratio, preferably in revolutions/time, preferentially 1/min, For the vertical end of the upshift characteristic:
    minimum vehicle acceleration For the gas pedal position of 100%; i.e. in particular maximum acceleration:
    difference of revolutions/speed of the transmission input shaft to target range/speed ratio, hereby identified in particular is the speed difference between the downshift characteristic and the upshift characteristic, preferably at a gas pedal position of 100% (full-load acceleration),
    time difference until upshift operation, hereby identified in particular is the time which passes subsequent a downshift operation until an upshift operation can occur again, particularly at a gas pedal position of 100% (full-load acceleration).

Further advantages, features and possible applications of the present invention will follow from the description below in conjunction with the figures.

Figure 2A:
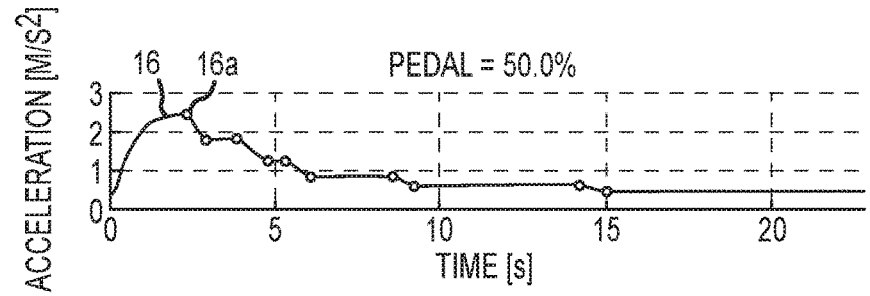
Figure 2B:
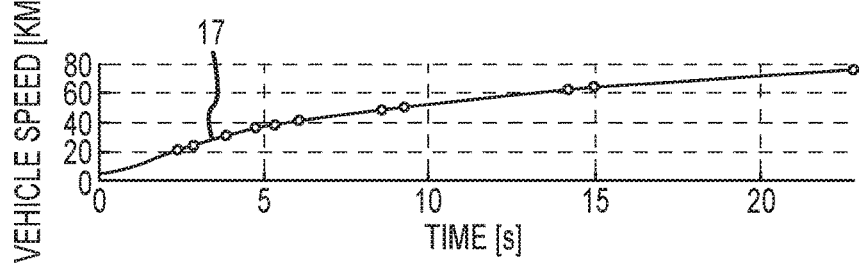
Figure 2C:
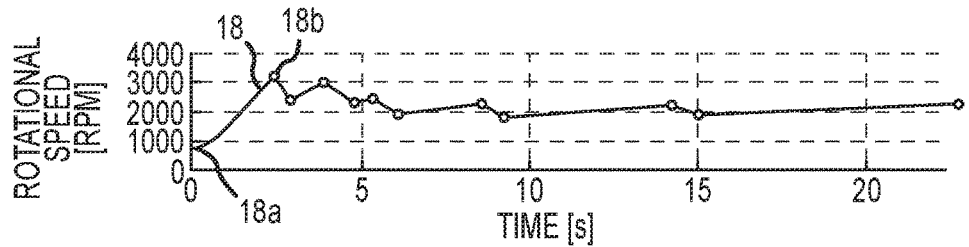
Figure 2D:
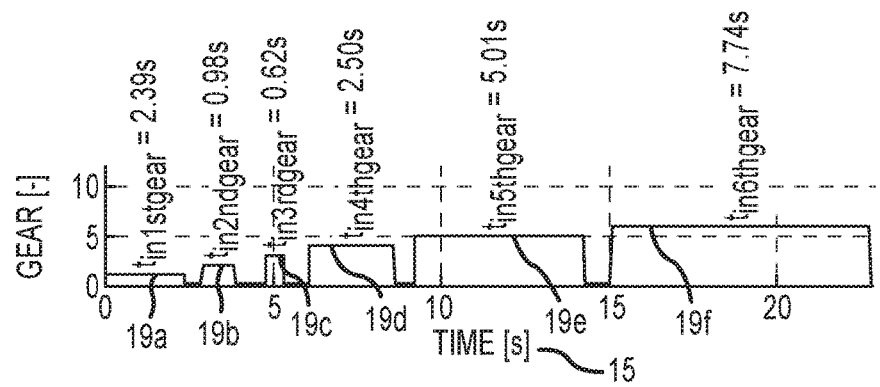
Figure 3:
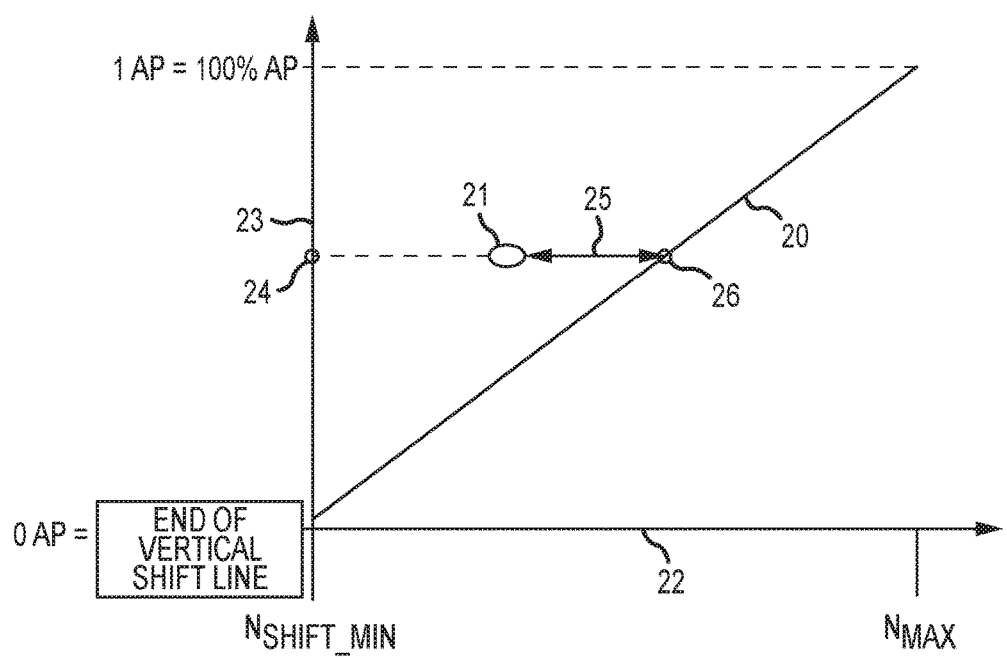
Figure 4:
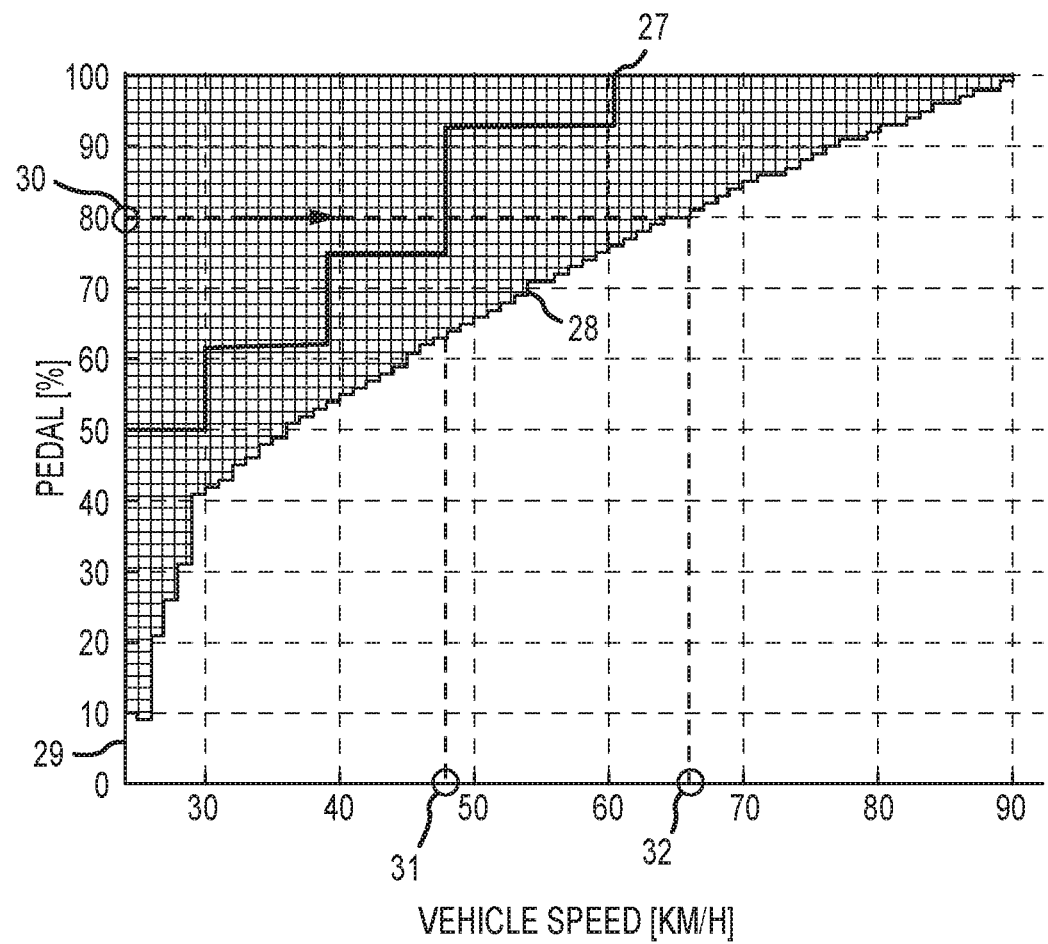
Figure 5A:
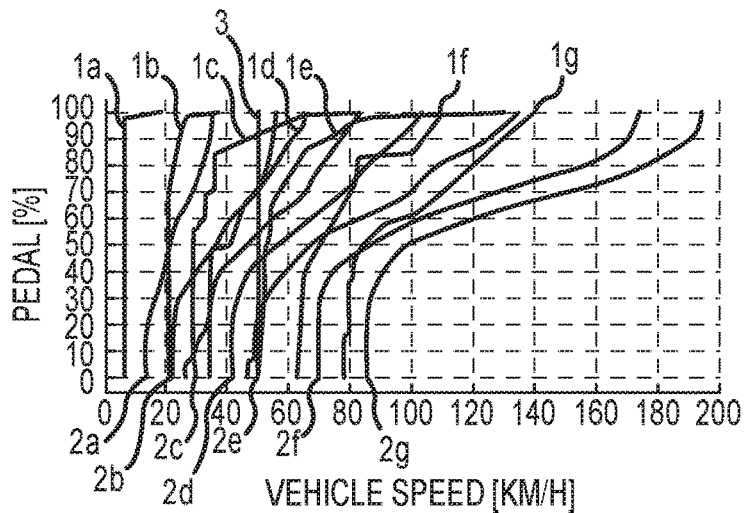
Figure 5B:
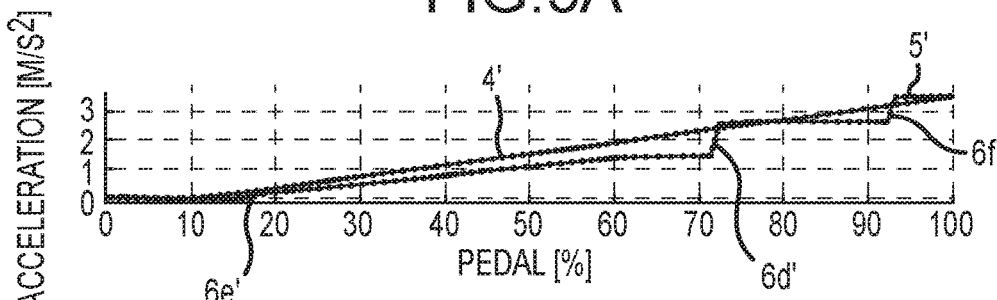
Figure 5C:
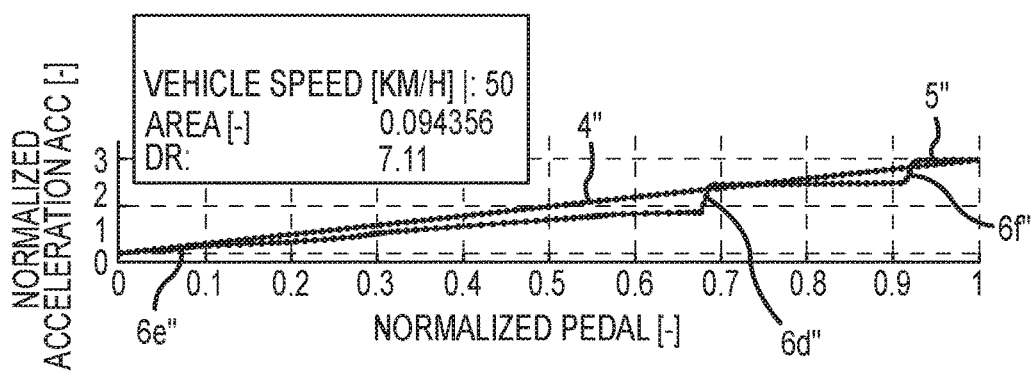
Figure 6:
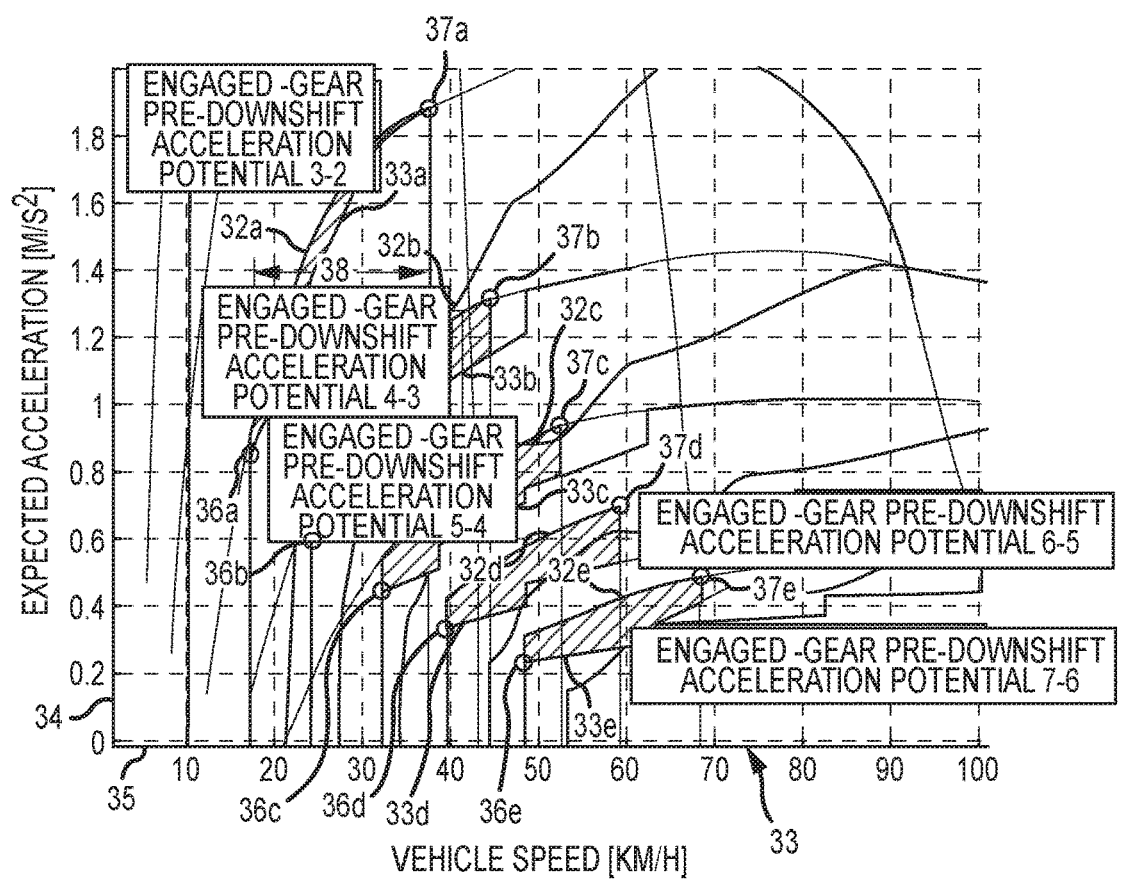
Figure 7:
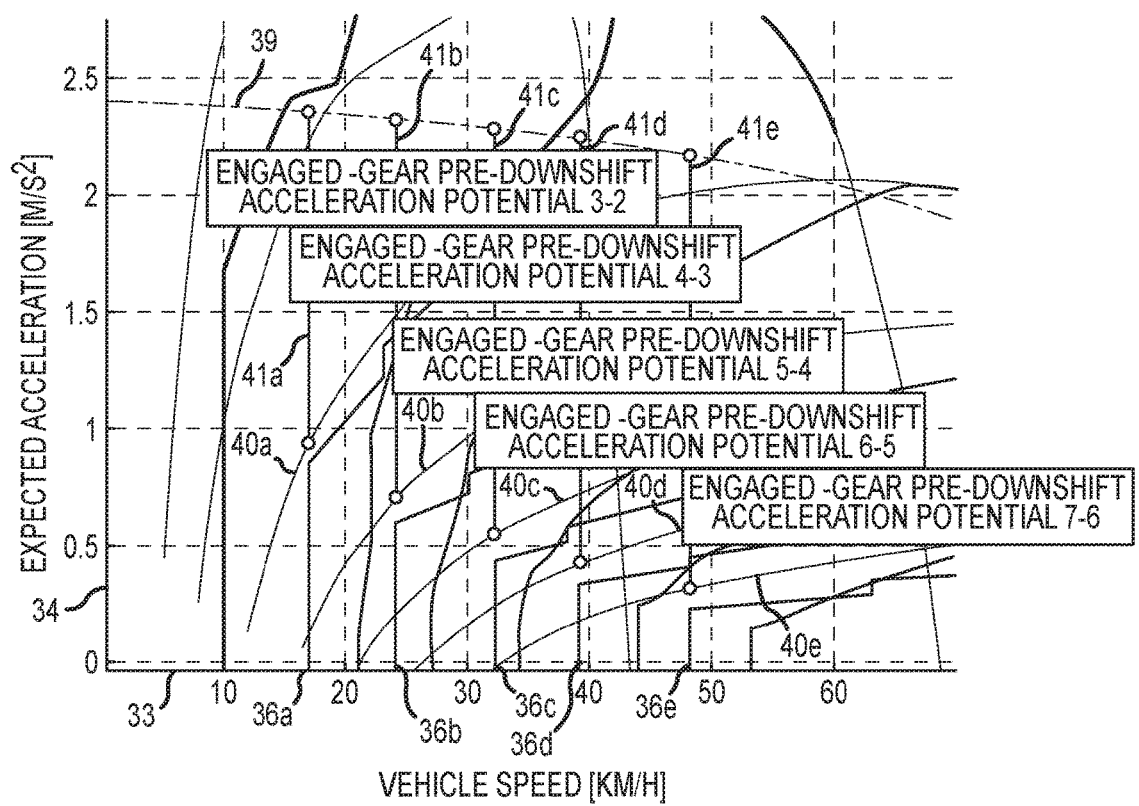
Figure 8:
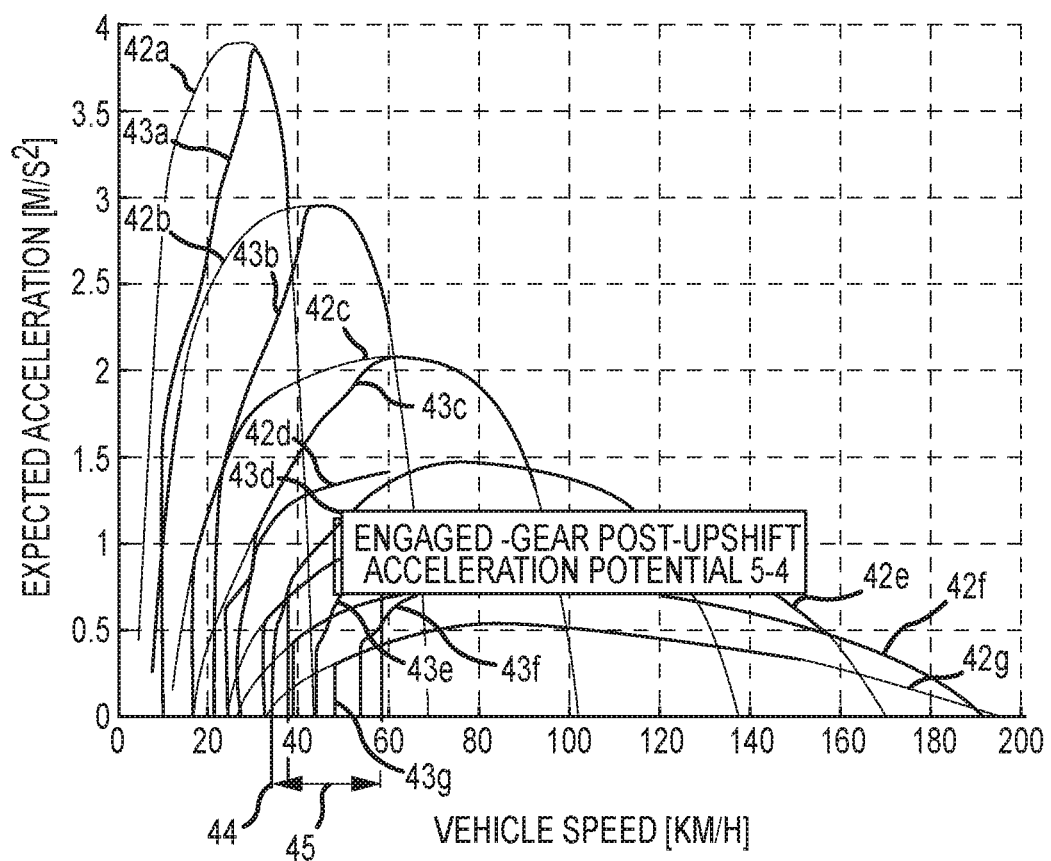
Figure 9:
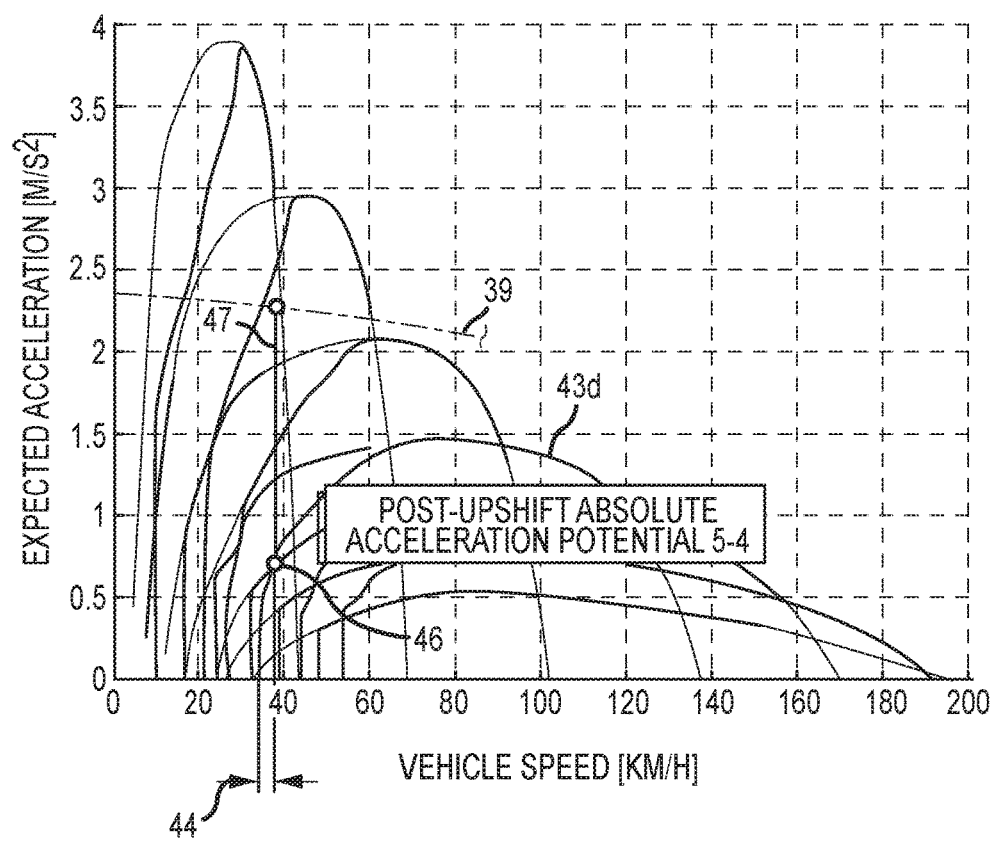

Shown are:

FIG. 1 a diagram of the correlation between the gas pedal position and the rotational speed of the transmission input shaft or the drive shaft of the drive unit respectively, FIG. 2A-2D are diagrams of the length of time the individual speed ratios are activated in the transmission device during an acceleration process, FIG. 3 a diagram of the rotational speed progression during a single upshift operation, FIG. 4 a diagram of the length of time a speed ratio remains active subsequent a downshift process until the next upshift process, FIG. 5A-5C are diagrams of the correlation between the gas pedal position and the vehicle speed as well as the vehicle acceleration and the gas pedal position in absolute and normalized representation, FIG. 6 a diagram of the given acceleration potential prior to downshift, FIG. 7 a diagram of the absolute acceleration potential prior to downshift, FIG. 8 a diagram of the given acceleration potential after upshift, FIG. 9 a diagram of the absolute acceleration potential after upshift.

FIG. 1 depicts the rotational speed progression 14a to 14d over multiple shifting processes at different gas pedal positions (PP). The gas pedal position (PP) is kept constant during such an acceleration procedure and can be read from the first y-axis 12. The gas pedal position can be preset between 0 (idle) and 100% (full-load). The rotational speed of the transmission input shaft is represented by graphical representations 14a to 14d. Graphical representation 14a hereby represents a full-load acceleration, gas pedal position 14g, thus acceleration at a gas pedal position of 100%. Common to all the depicted graphical representations 14a to 14b is that they depict four upshift processes. The shifting operations yield a sawtooth-like profile to graphical representations 14a to 14d. Vehicle acceleration 14b is reached with gas pedal position 14h, vehicle acceleration 14c with gas pedal position 14i and vehicle acceleration 14d with gas pedal position 14j.

The input speed in the transmission device can be read from the second y-axis 13, this corresponds on the one hand to the speed of the transmission input shaft and, on the other, the speed of the drive unit's drive shaft. The acceleration processes (14a to 14d) are in each case depicted over time 1.

For determining a characteristic value, in the present case the value for the upshift/speed behavior, it is ultimately the speed prior to and subsequent the shifting process, particularly immediately before (see data points 14a1) and after (see data points 14a2) the shifting process, which is of great importance. The data points 14a1 and 14a2 are only indicated for full-load acceleration here, they are also equally provided as 14b to 14d in the graphs.

The chronological sequence of the vehicle acceleration 16 is plotted for a gas pedal position of 50% in FIG. 2a). Further depicted is the vehicle speed progression over time 17, FIG. 2b), the rotational speed of the transmission input shaft 18, FIG. 2c), and the time during which a speed ratio is activated 19, FIG. 2d). The time 15 is plotted on the x-axis for all the FIGS. 2a) to 2d).

The depicted relationship notwithstanding, any other gas pedal position would also be possible. Acceleration 16 shows that it decreases after each upshift process, explicitly indicated is the upshifting 16a from 1st into 2nd gear. When the vehicle starts from a standstill, the acceleration initially increases continuously, this is explained by the speed/torque behavior of the drive unit. The vehicle speed 17 increases through all the shifting processes and depends on the progress of the acceleration 16.

FIG. 2c) depicts the rotational speed of the transmission input shaft or drive shaft of the drive unit respectively over time. At an acceleration from standstill, the engine speed first increases continuously from the idle speed 18a. If the shifting speed 18b for upshift from 1st into 2nd gear is reached, the next speed ratio is activated. The speed initially drops with such an upshift process and then increases again, provided the vehicle continues to accelerate, until reaching the next shifting speed.

FIG. 2d) depicts for how long which speed ratio is activated. The first gear is first engaged for interval 19a, an upshift then follows into 2nd gear for interval 19b, the 3rd, 4th, 5th and 6th gears are then engaged in sequence for the time intervals 19c, 19d, 19e and 19f until the end of the acceleration process. An important characteristic value can be determined for the transmission device from these times in which the individual speed ratios are activated (19a-19f) with the cited calculation rules.

FIG. 3 juxtaposes the speed ratio at the beginning of the shifting process against a precalculated speed ratio 20. The target curve 20 depicted here as a straight line is thereby freely configurable for the precalculated speed ratio such that it can illustrate different operating modes (energy-efficient, sport, comfort or others). In other words, a progression differing from this linear progression is also conceivable, this can make sense for example when specific demands in terms of fuel consumption or sportiness need to be achieved. In the diagram shown in FIG. 3, the gas pedal position 23 is depicted over the speed of the transmission input shaft 22 or drive shaft of the drive unit respectively. The distance between the calculated rotational speed 21 of the transmission input shaft and the precalculated rotational speed 26 for a specific gas pedal position then allows determining the distance 25 between rotational speeds 21 and 26 for this specific gas pedal position 24. An important characteristic value for the evaluation of the transmission device can be derived from distance 26.

FIG. 4 provides a graphic representation which allows an evaluation of the time interval during which a specific speed ratio is active between a downshift and an upshift, in the depicted example a change from 4th into 3rd gear (and back). Predefined as boundary conditions for determining this characteristic value are the gas pedal position (constant), the start of the time measurement immediately after downshifting (from 4th into 3rd gear) and the end of the time measurement, that when upshifting is initiated (from 3rd into 4th gear). It is thereby clear that this can similarly represent all the other gear changes.

The stepped line 27 thereby marks the downshift characteristic (start of time measurement). If one assumes a gas pedal position 30 of 80%, downshift 31 is initiated at approximately 48 km/h vehicle speed.

At a continued constant gas pedal position 30 of 80%, the ensuing upshift occurs at approximately 65 km/h. How long a speed ratio is activated can be derived from this context. This then allows an important characteristic value to be derived for the evaluation of the transmission device as many drivers perceive the selected speed ratio being activated for a long time subsequent a downshift (27) in a positive light. This behavior can be understood in the sense of shifting process hysteresis.

The difficulty of optimization in this context clearly results from the fact that the individual criteria for calibrating the transmission device influence each other and are to some extent contrary.

For example, downshifting at a lower speed leads to this speed ratio (gear) being activated for a longer time until the upshift line (28) is reached, which is overall positive for this characteristic value. Likewise, however, this deferral of the downshift characteristic also leads to worsened vehicle acceleration, which is generally negative for another characteristic value.

FIG. 5a) depicts the correlation between the gas pedal position (pedal [%]) and the vehicle speed (vehicle speed [kph]) for a power train having an 8-speed automatic transmission with torque converter. Here, the pedal position represents the driver's desired driving performance; i.e. at pedal position=100%, the driver calls up the maximum available power at that moment from the drive unit, at pedal position=0%, no driving power is being requested; i.e. the vehicle is at a standstill or in coasting mode. At pedal=100%, the vehicle will continue to accelerate starting from its current driving speed until the gas pedal position is changed or terminal vehicle velocity is reached. This diagram further depicts the shift lines for the upshifting (1a-1g) of the transmission and for the downshifting (2a-2g). Shift line 1a thereby represents the time points for the gear change from 2nd into 1st gear, shift line 1b represents the time points for the gear change from 3rd into 2nd gear, etc. Correspondingly, shift line 2a represents the time points for the gear change from 1st into 2nd gear, shift line 2b the time points for the gear change from 2nd into 3rd gear, etc. Accordingly derivable from FIG. 5a) is that the last gear, thus the 8th gear in the present case, is always engaged to the right of shift line 2f.

FIG. 5b) indicates the target value progression 4' for the vehicle acceleration, indicated as being linearly dependent on the gas pedal position (pedal [%]). The target objective 4 thereby yields a straight line. Since the drive motor has on the one hand a rotational speed-dependent variable torque and, on the other, the usable speed range of the combustion engine utilized as the drive motor is relatively small, the drive power which the drive motor is able to deliver is adapted to the driving performance requirements resulting from the driving resistances by means of a transmission device. The goal in doing so is to design and control the power train and thus also the automatic transmission such that the actual vehicle acceleration 5' coincides with the target objective 4' to the greatest extent possible or there is only a slight difference between the two. The driving speed of 50 km/h is expressed as vertical line 3 in FIG. 5a), FIGS. 5a) and 5b) are solely representations of this driving speed.

It can now be seen in FIG. 5a) that the 5th gear is engaged at driving speed 3. If the driver presses the gas pedal at this time to approximately 17%, the transmission control indicates a downshift and the automatic transmission shifts from 5th back into 4th gear, as indicated at shift point 6e. This downshifting increases the drive torque able to be delivered to the wheels of the vehicle. The rotational speed of the drive wheels initially remains unchanged and the available drive power increases abruptly. This sudden increase 6e' in characteristic 5' reflects the jump in the vehicle's acceleration. Should the driver desire even greater acceleration, thus pressing the gas pedal above a gas pedal position of approximately 70%, the automatic transmission then executes a further downshift 6d, i.e. shifts back down from 4th into 3rd gear. This also results in a jump 6d' in the actual vehicle acceleration. The target value setting for the acceleration 4' can thereby be briefly exceeded immediately after the shifting due to the speed/torque characteristic of the torque converter. If the driver calls for the vehicle to provide maximum or near-maximum acceleration, thus pressing the gas pedal to approximately 90% or higher, the automatic transmission then executes a further downshift 6f. Here, the 2nd gear engages in the automatic transmission instead of the 3rd gear. Here as well, the actual vehicle acceleration can briefly exceed the target acceleration.

FIG. 5c) depicts actual vehicle acceleration (FIG. 5b), 5') in normalized form 5" (value range, 0-1) over the normalized gas pedal position 4" (value range, 0-1). This depiction yields the relationship between normalized target acceleration 4" and normalized vehicle acceleration 5", as is in principle already known from FIG. 5b) for the non-normalized values. The depiction is easier to apply to further comparisons and optimizations of the transmission control and the transmission.

The shift points (6e", 6d", 6f") with their jumps are just as recognizable in the vehicle acceleration as in the non-normalized representation.

FIG. 6 depicts the correlations between acceleration 34 and vehicle speed 35 as well as the shift characteristics 33a to 33e for the evaluation of a vehicle's acceleration potential.

With this in mind, the acceleration potential is to be understood as the property of vehicle acceleration without downshifting. Many drivers find vehicle acceleration utilizing the torque of the drive unit and without transmission device downshift to be pleasing. This is generally easier to realize with high-torque drive units than with low-torque drive units.

Despite this dependence on the drive unit torque, the gradation and control of the transmission device also takes on a significant role with this vehicle property and in the determining of a characteristic value.

The acceleration potential of the vehicle is on the one hand determined by the full-load acceleration of the vehicle and, on the other, by downshift at a lower speed ratio. The full-load acceleration dictates in this context the maximum possible acceleration at 100% gas pedal position and is thus subject on one hand to the driving speed 33 and, on the other, to the activated speed ratio (1st to n-th gear). Hence, characteristic full-load acceleration curves 32a to 32e result for the full-load acceleration.

In vehicle acceleration, a general differentiation is made between kick-down acceleration and rising pedal acceleration. In kick-down acceleration, the gas pedal position is immediately engaged to a value of 100%, the transmission device thereby normally initiating at least one downshift. The drive unit's speed increases with this downshift and as a rule so does the drive power and acceleration able to be introduced into the system. Such kick-down acceleration is not under consideration at present.

In rising pedal acceleration, the gas pedal is engaged more slowly to a value of <100%, the vehicle is then accelerated without a downshift. This is the type of acceleration being taken into account for the characteristic value proposed herein.

The downshifts are indicated by the characteristic downshift curves 33a to 33e, the acceleration potentials can be derived from the correlation between the characteristic full-load acceleration curves 32a to 32e and the characteristic downshift curves 33a to 33e. By calculating the surface area between a full-load characteristic (32a to 32e) and the associated downshift characteristic (33a to 33e), it is possible to determine a characteristic value, that for the quantitative evaluation of the acceleration potential with rising pedal acceleration.

The calculation of the acceleration potential prior to downshift clearly proceeds from the lowest speed at which a specific speed ratio (straight line) is still activated. If the vehicle were thus to continue to lose speed, a downshift would then be initiated in the transmission device. Based on these speeds 36a to 36e, the acceleration potential up to the respectively associated speeds 37a to 37e is determined. The speeds 37a to 37e are in each case higher by about speed 38, here 20 km/h, than speeds 36*a* to 36*e*. The vehicle acceleration can be read from the x-axis 34 and the vehicle speed from the y-axis 33.

As in FIG. 6, the vehicle acceleration 34 is also plotted over the vehicle speed 33 in FIG. 7. A further important characteristic value for the acceleration potential prior to downshift can be determined from this representation, in this case the absolute acceleration potential.

For the evaluation of the transmission device, the acceleration potential able to be achieved by the vehicle independent of the activated speed ratio is determined for the previously determined speeds 36*a* to 36*e*. In contrast to the acceleration potential (FIG. 6) no speed range (FIG. 6, no. 38) needs to be specified for the absolute acceleration potential calculation.

The basic situations (FIG. 6, FIG. 7) are similar, the lowest speed ratio possible for a specific speed is run for the calculation; i.e. a further decrease in vehicle speed, as of these speeds (36*a* to 36*e*), would result in a transmission device downshifting.

Additionally plotted is the target function/reference function for the vehicle acceleration 39, this acceleration is independent of the activated speed ratio and can for example be derived from an analysis of pre-existing vehicles, it is thereby preferential for the acceleration potential dictated by the target function to be larger than the acceleration potential of the existing vehicles. The absolute vehicle acceleration 39 is compared to the vehicle accelerations 40*a* to 40*e* attainable at the respective speed ratios at speeds 36*a* to 36*e*.

The absolute acceleration potentials 41*a* to 41*e* are determined from this comparison and a characteristic value derived pursuant to the related calculation rules.

FIG. 8 depicts a diagram on the basis of which a further characteristic value is formed, in this case the value for the acceleration potential after an upshift. For the determination of this value, the calculation starts from a short offset 44 following an upshifting (upshift point+4 km/h) and ends at the end of the calculation period 45, wherein 20 km/h is indicated here as the calculation period.

The relevant upshift points are the result of the freely configurable characteristic upshift curves (43*a* to 43*f*). The acceleration attainable with the drive unit at a specific speed ratio is indicated by the characteristic curves 42*a* to 42*g*. In this context, meaning immediately after the upshift, 4 km/h (44) according hereto. This calculation likewise ends, as does the calculation for the acceleration potential value prior to downshift (FIG. 7), after a certain speed difference (45). In the present case, the calculation interval is 20 km/h.

FIG. 9 shows a diagram for the determination of the absolute acceleration potential subsequent to an upshift. FIG. 9 thereby corresponds substantially to FIG. 8 such that the following will largely address the differences between the figures. The upshift point 46 is on the upshift characteristic curve 43*d*. Additionally indicated is the target function/reference function for the vehicle acceleration 39. As set forth, this refers to accelerations which can be attained at low drive unit speeds, which is why the actual vehicle acceleration attainable at higher speeds, here 1st and 2nd gear, can be higher than this target function. The distance 47 between the reference function/target function 39 and the upshift point is a measure of the vehicle's absolute acceleration potential, particularly at low drive unit speed, and can be quantified utilizing the proposed calculation rules.

Corresponding to FIG. 7, the calculation of multiple acceleration potentials is also afforded in FIG. 9, these individual absolute acceleration potentials are not depicted in this figure in favor of greater clarity.

The invention claimed is:

1. A method to determine at least one parameter for evaluation or optimizing of a transmission device for a motor vehicle, the transmission device able to be shifted between a first and at least one second speed ratio, the transmission device including at least one transmission input element and at least one transmission output element and which can be connected in a torque-conducting manner to at least one drive unit having a plurality of possible operating points, wherein torque output or input by the drive unit and an engine speed which are provided to a transmission control unit which controls the shifting processes of the transmission device subject to a respective operating point and, if need be, subject to additional parameters which specify constant and/or variable properties of a motor vehicle and the motor vehicle's environment,
wherein:
operating point changes of the drive unit are effected by a predefined constant or variable target value specification and shifting processes thereby induced in the transmission device;
a progression of an at least one output parameter is measured, prior to and/or during and/or subsequent to the shifting process, which is characteristic of a speed behavior of the at least one transmission output element;
the progression of the at least one output parameter is compared to a predefined output parameter progression; and
the at least one parameter is determined from the comparison which is representative of deviations.

2. The method according to claim 1 for the calculating of a characteristic value (upshift/speed value),
wherein:
the rotational speed of the transmission input element, prior to and subsequent a shifting process, is determined during an acceleration process of the vehicle,
the acceleration process starts from vehicle standstill,
the position of a gas pedal is kept constant for the acceleration process,
a first speed difference is formed from the speeds prior to shifting for at least two successive shifting processes,
a second speed difference is formed from the speeds subsequent shifting for at least two successive shifting processes,
an average speed difference is formed from these first and second speed differences, and
a characteristic value for the upshift speed behavior of the transmission device is derived from this averaged speed difference.

3. The method according to claim 1 for the calculating of a characteristic value (upshift/gear period value),
wherein:
the vehicle performs an acceleration process,
a gas pedal position is specified as a constant for this acceleration process and selected such that at least two shifting processes are performed between speed ratios of the transmission device,
time intervals during which the speed ratios are respectively active are determined,
a time interval of an individual speed ratio being activated is correlated to the longest interval of activated speed ratio, and
a characteristic value for an upshift gear period of the transmission device is derived therefrom.

4. The method according to claim 1 for the calculating of a characteristic value (upshift/start/speed value), wherein:

a gas pedal position is specified as a constant, the transmission device executes a shifting process, the rotational speed of the transmission input element is determined at the beginning of the shifting process, an expected speed of the transmission input element is calculated for the end of the shifting process as a function of the gas pedal position, the speed of the transmission input element and the gas pedal position are normalized, and a characteristic value (upshift/start/speed value) for the speed behavior of the transmission device at the beginning of the shifting process is derived from these normalized parameters.

5. The method according to claim 1 for the calculating of a characteristic value (downshift/acceleration value), wherein:

a gas pedal position is specified as a constant, the vehicle accelerates until a specific vehicle speed based on the gas pedal position, the transmission device executes at least one shifting process during this acceleration, the actual vehicle acceleration is determined during an acceleration process, that the actual vehicle acceleration is compared to a predefined target vehicle acceleration, and the characteristic value (downshift/acceleration value) for the ideal acceleration is derived from the degree of deviation between the target vehicle acceleration and the actual vehicle acceleration.

6. The method according to claim 1 for the calculating of a characteristic value (speed ratio/active value), wherein:

a gas pedal position is specified as a constant, the gas pedal position effects a vehicle acceleration and is selected such that the transmission device executes a downshift process on the basis of the pedal position, the time until the transmission device executes an upshift process is collected, a characteristic value (speed ratio/active value) is derived from said collected time for the period of time a speed ratio is activated.

7. The method according to claim 1 for the calculating of a characteristic value (pre-downshift acceleration potential value), wherein:

a first speed for a vehicle is initially specified, which is selected such that upon this speed dropping, the transmission device immediately executes a downshift process, the determination of the characteristic value starting from this first speed continues until a second predefinable speed is reached, the maximum possible vehicle acceleration for the vehicle speed able to be achieved with the drive unit is determined, that same is compared to the acceleration achievable for the vehicle taking the transmission device into account, a characteristic value (pre-downshift acceleration potential value) for the acceleration potential prior to downshift is derived from said comparison.

8. The method according to claim 1 for the calculating of a characteristic value (absolute pre-downshift acceleration potential value), wherein:

a first speed for the vehicle is specified, the maximum drive power able to be drawn from the drive unit is calculated for the first speed and that an achievable vehicle acceleration is derived therefrom, the acceleration possible at the maximum drive power of the drive unit at this first speed is calculated, the achievable and the possible acceleration are compared, and a characteristic value (absolute pre-downshift acceleration potential value) for the absolute acceleration potential prior to downshift is derived from said comparison.

9. The method according to claim 1 for the calculating of a characteristic value (post-upshift acceleration potential value), wherein:

a first driving condition is specified characterized by the vehicle being at least substantially immediately subsequent an upshift process, the determination of the characteristic value starting from this first driving condition continues until a second predefined driving condition which is characterized in particular by a higher vehicle speed is reached, a maximum possible vehicle acceleration able to be achieved with the drive unit is determined as a function of vehicle speed, the maximum possible vehicle acceleration able to be achieved with the drive unit is compared to the acceleration achievable for the vehicle taking the transmission device into account, and a characteristic value (post-upshift acceleration potential value) for the acceleration potential subsequent upshift is derived from said comparison.

10. The method according to claim 1 for the calculating of a characteristic value (absolute post-upshift acceleration potential value), wherein:

a first driving condition is specified for the vehicle, a maximum drive power able to be drawn from the drive unit is calculated for the first driving condition and that an achievable vehicle acceleration is derived therefrom, the acceleration possible at the maximum drive power of the drive unit at this first speed is calculated, the achievable and the possible acceleration are compared, and a characteristic value (absolute post-upshift acceleration potential value) for the absolute acceleration potential subsequent upshift is derived from said comparison.

11. The method according to claim 1, wherein:

at least one total characteristic value $DR_p$ is formed from at least two characteristic values $DR_{final}$ or $DR_{base}$ for the transmission device, wherein each DRi value corresponds to a $DR_{final}$ value or to a $DR_{base}$ value respectively, the total characteristic value is calculated by summation of n individual values/characteristic values, and the individual characteristic values are exponentiated by a weighting function p, that the total characteristic value satisfies the calculation rule:

$$DR_p(DR_1, DR_2, \ldots DR_n) = 11 - \left(\frac{1}{n}\sum_{i=1}^{n}(11 - DR_i)^p\right)^{\frac{1}{p}}.$$

12. The method according to claim 11, wherein a global characteristic value $DR_{pg}$ for the transmission device is determined from 1, albeit at least two total characteristic values $DR_p$, and that the global characteristic value satisfies the calculation rule:

$$DR_{pg} = 11 - \left(\frac{1}{\sum_{k=1}^{l} w_k} \cdot \sum_{k=1}^{l} w_k \cdot (11 - DR_k)^p\right)^{\frac{1}{p}}$$

wherein wk represents a weighting factor for individual total values.

13. The method according to claim 1, wherein at least one characteristic value, total characteristic value or global characteristic value is used for the optimization of the transmission device, and transmission device parameters are varied pursuant to a numerical optimization process in the calculation of this at least one characteristic value.

\* \* \* \* \*